(12) United States Patent
Sitrick et al.

(10) Patent No.: US 10,996,026 B1
(45) Date of Patent: May 4, 2021

(54) EXTERNAL SUBSYSTEM FOR AUTOMATIC WEAPON SYSTEM TO DETERMINE WHICH WEAPON HAS GREATEST PROBABILITY OF HITTING THE TARGET

(71) Applicants: David H. Sitrick, Pacific Palisades, CA (US); Brett C. Bilbrey, Sunnyvale, CA (US)

(72) Inventors: David H. Sitrick, Pacific Palisades, CA (US); Brett C. Bilbrey, Sunnyvale, CA (US)

( * ) Notice: Subject to any disclaimer, the term of this patent is extended or adjusted under 35 U.S.C. 154(b) by 0 days.

(21) Appl. No.: 16/898,361

(22) Filed: Jun. 10, 2020

(51) Int. Cl.
*F41G 3/14* (2006.01)
*F41G 3/16* (2006.01)

(52) U.S. Cl.
CPC ............... *F41G 3/14* (2013.01); *F41G 3/165* (2013.01)

(58) Field of Classification Search
CPC ........................................................ F41G 3/14
USPC ................................................ 235/404, 407
See application file for complete search history.

(56) References Cited

U.S. PATENT DOCUMENTS

| | | | |
|---|---|---|---|
| 10,048,039 B1* | 8/2018 | Bell | B64C 39/024 |
| 2004/0007121 A1* | 1/2004 | Graves | G01C 21/20 |
| | | | 89/1.11 |

* cited by examiner

*Primary Examiner* — Toan C Ly
(74) *Attorney, Agent, or Firm* — David H Sitrick, Esq.

(57) ABSTRACT

An automated weapons system is comprised of a plurality of weapon subsystems each comprising at least one human transported weapon subsystem. Each of the plurality of weapon subsystems is comprises a barrel, a targeting subsystem, a computational subsystem, positioning means, and a firing subsystem. The barrel is utilized for propelling a munition from each of the plurality of weapon subsystems aimed towards an area of sighting. The targeting subsystem identifies a chosen target for each of said plurality of weapon subsystems in the area of sighting. The computational subsystem, responsive to the targeting subsystem, determines where the chosen target is for each weapon subsystem (out of plurality) and where the respective barrel needs to be aimed for each weapon subsystem (out of plurality) so that the munitions will strike the chosen target. The positioning means adjusts the aim of the munitions for each weapon subsystem, responsive to the computational subsystem, out of plurality of weapons subsystems. The firing subsystem, fires the munitions from at least one to each of said plurality of weapon subsystems at the chosen target for one of the weapons subsystems, responsive to the positioning means from at least one of the plurality of the weapons subsystems.

21 Claims, 23 Drawing Sheets

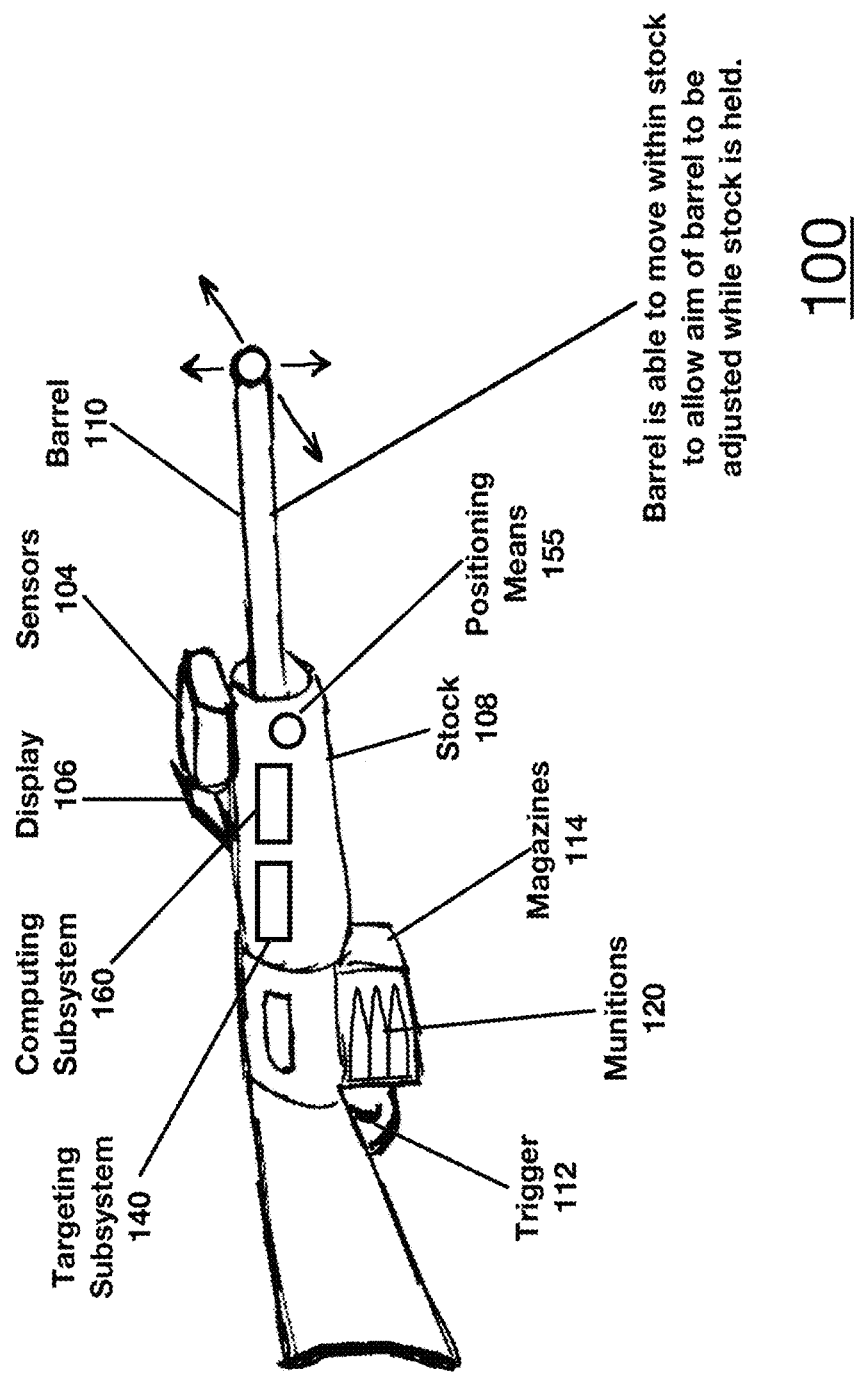
FIG. 1
Amended

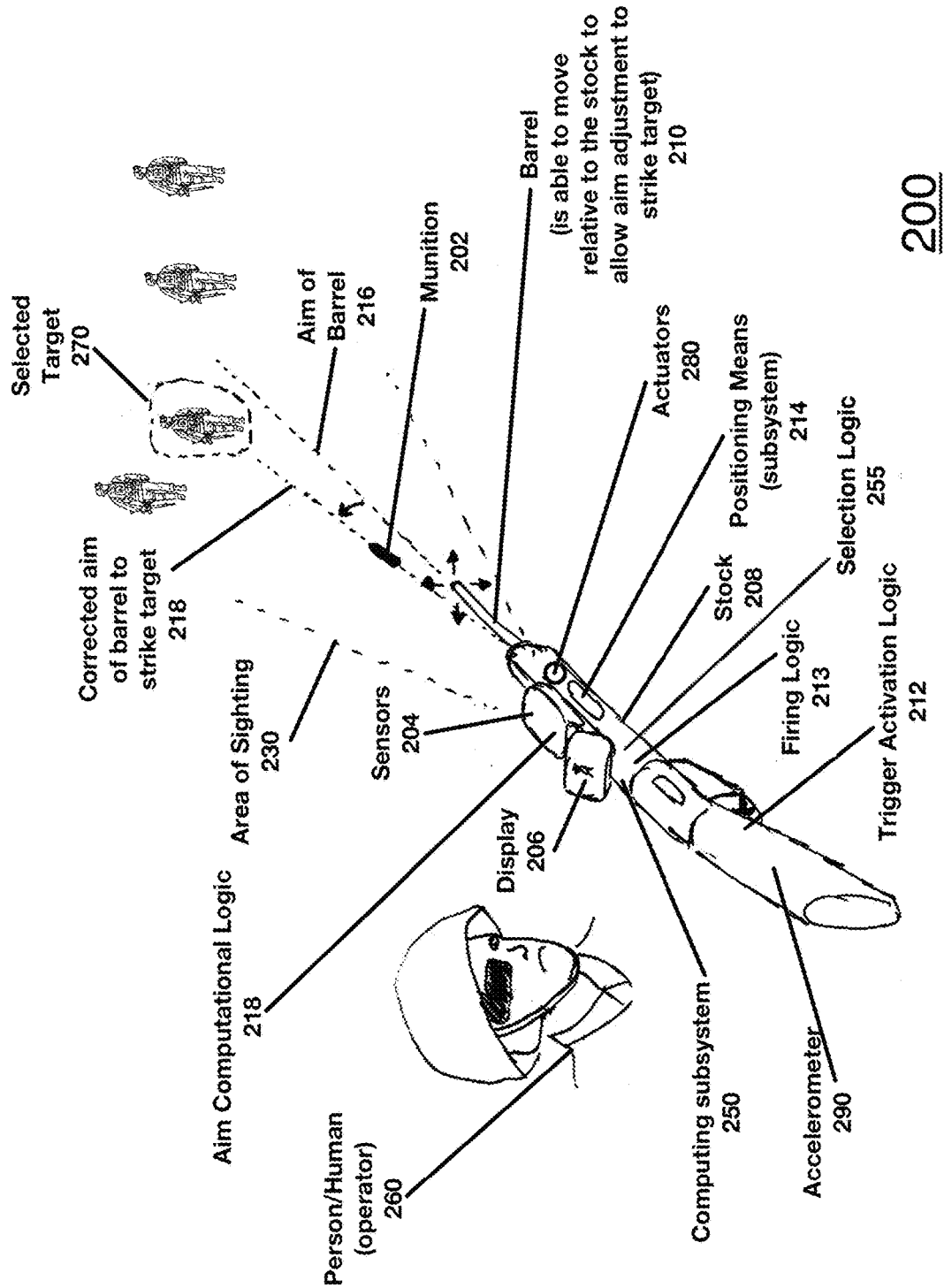
FIG. 2A
Amended

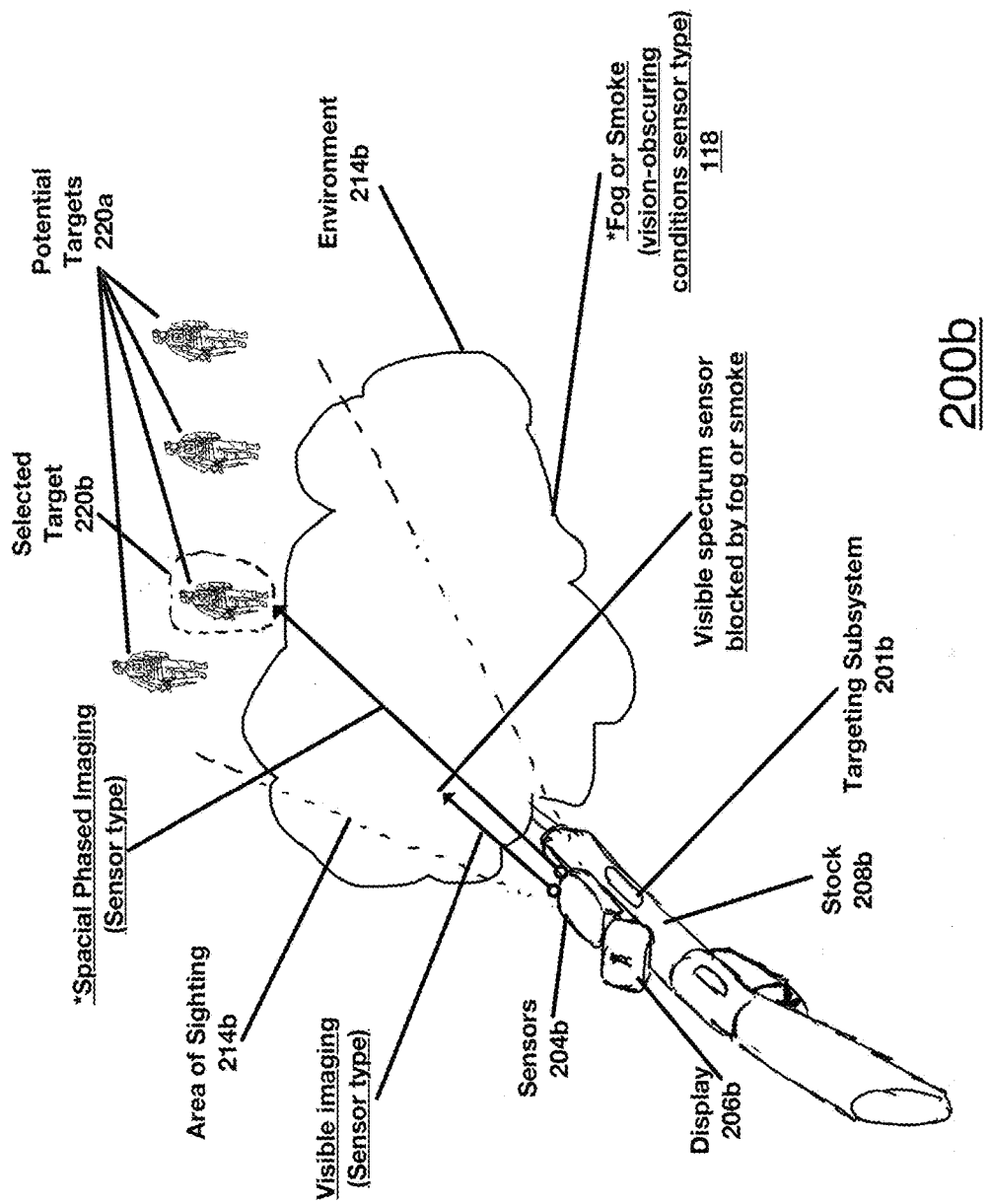
FIG. 2B
Amended
(Use of addional sensors to increase ability for user to select target through environment)

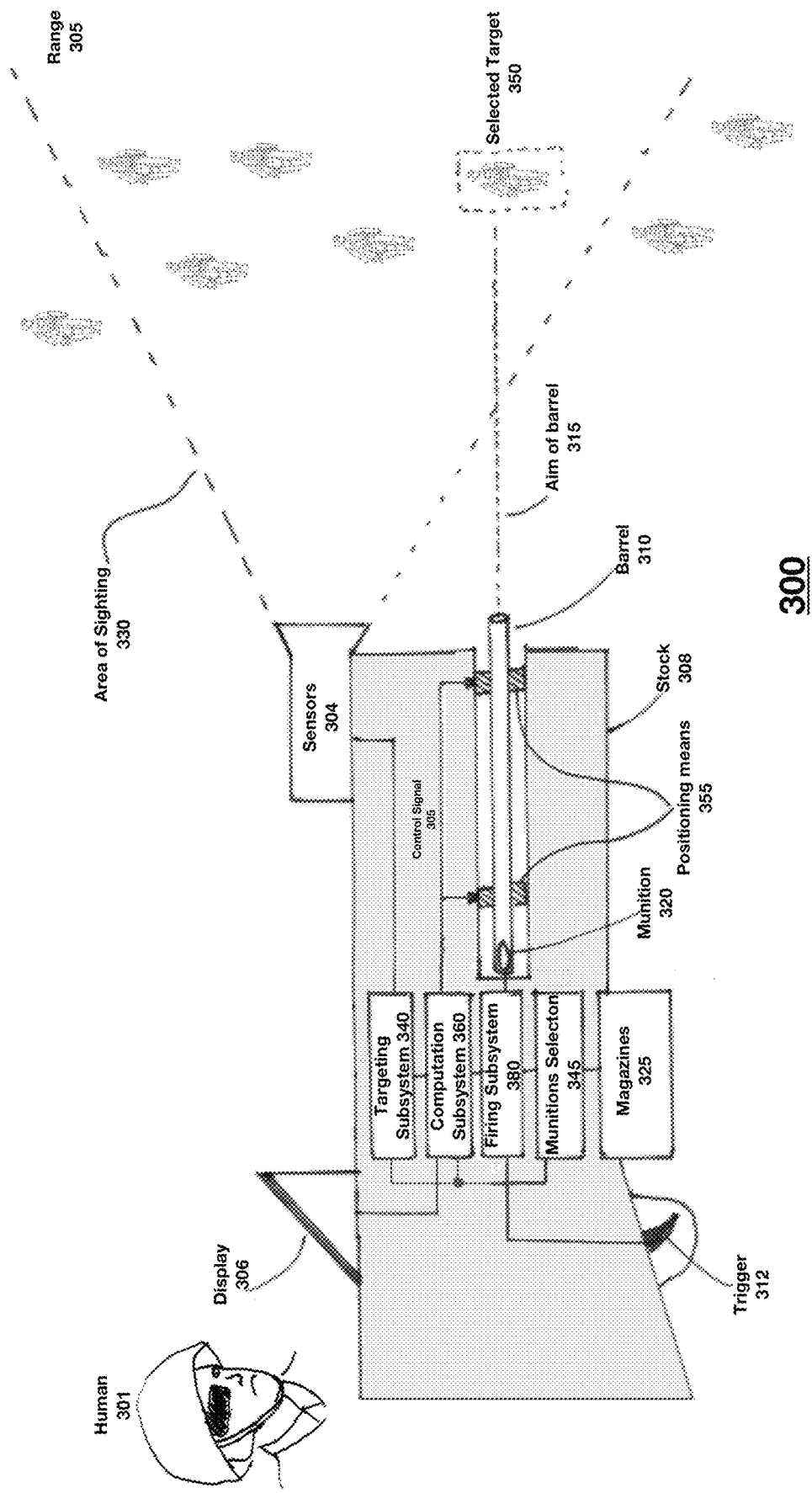
FIG. 3
Amended

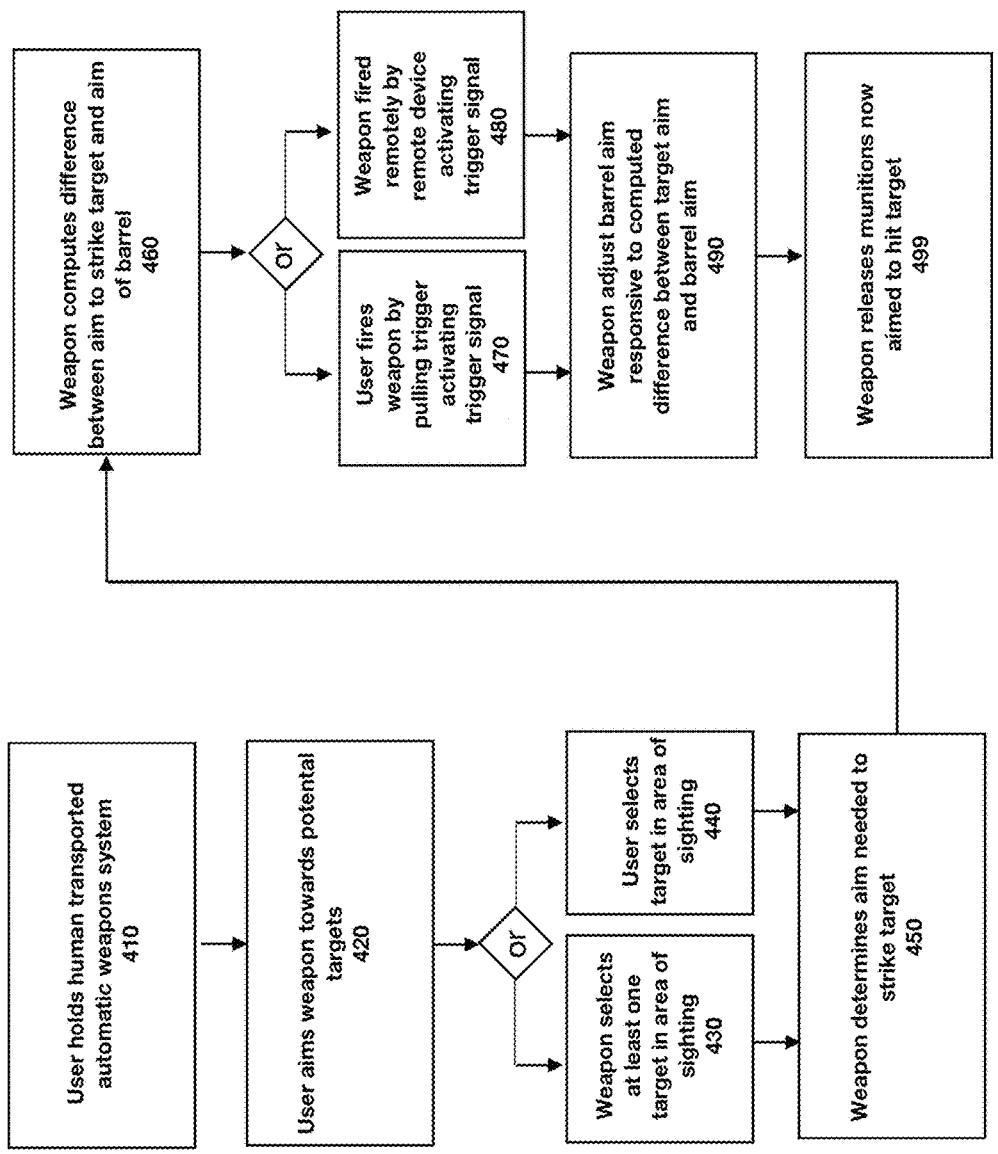
FIG. 4
Amended

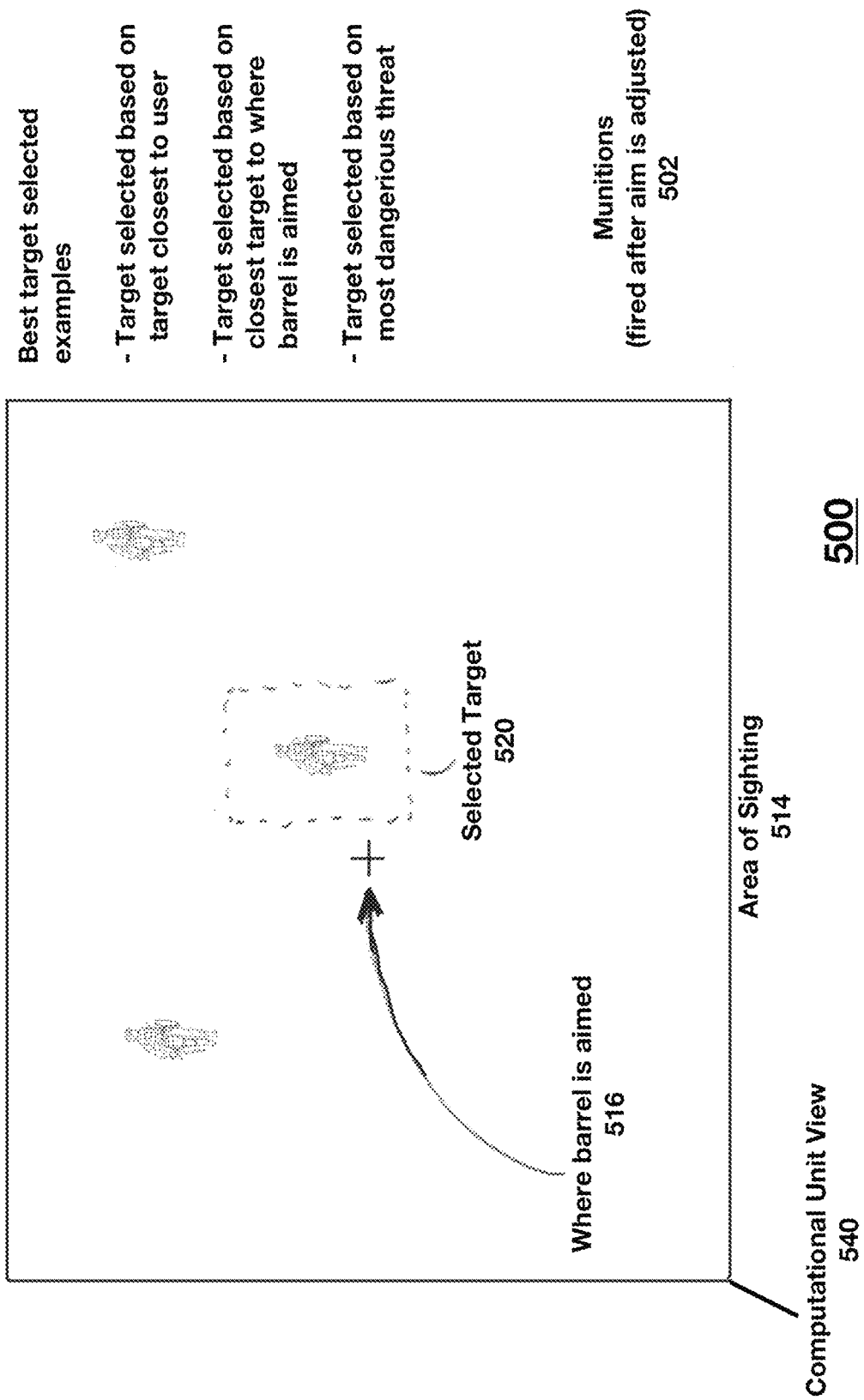
FIG. 5
Amended

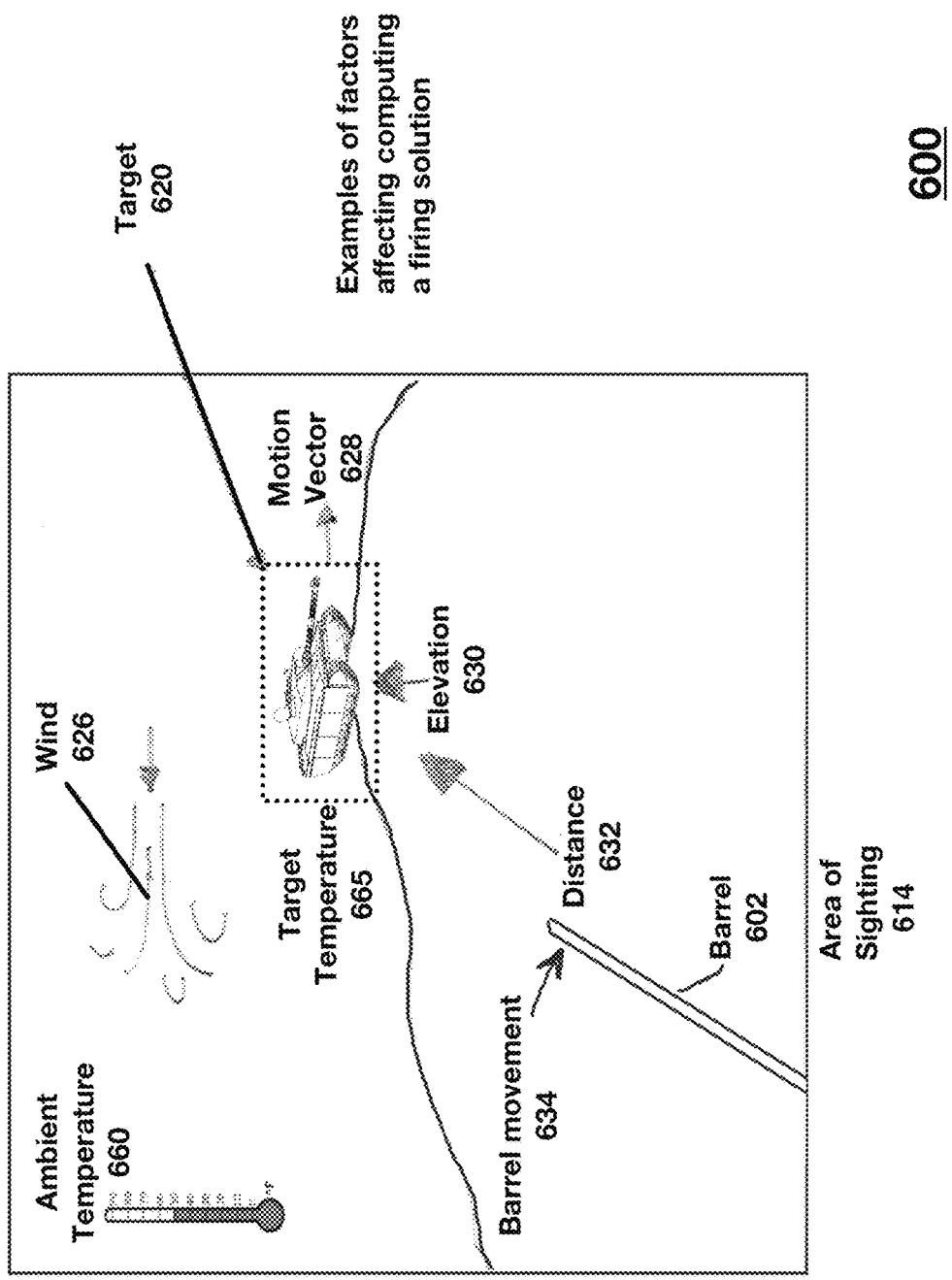
FIG. 6
Amended

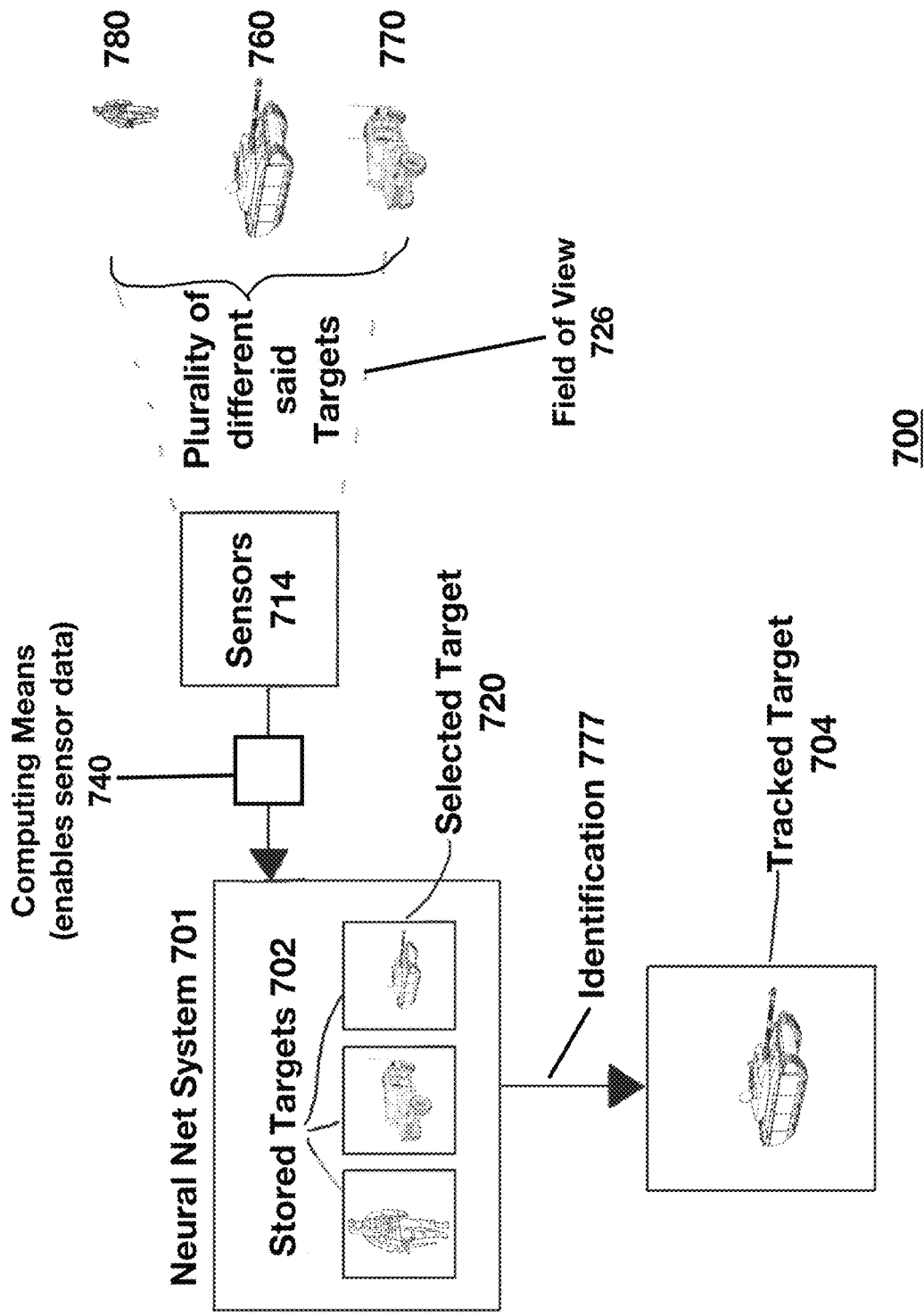
FIG. 7 Amended

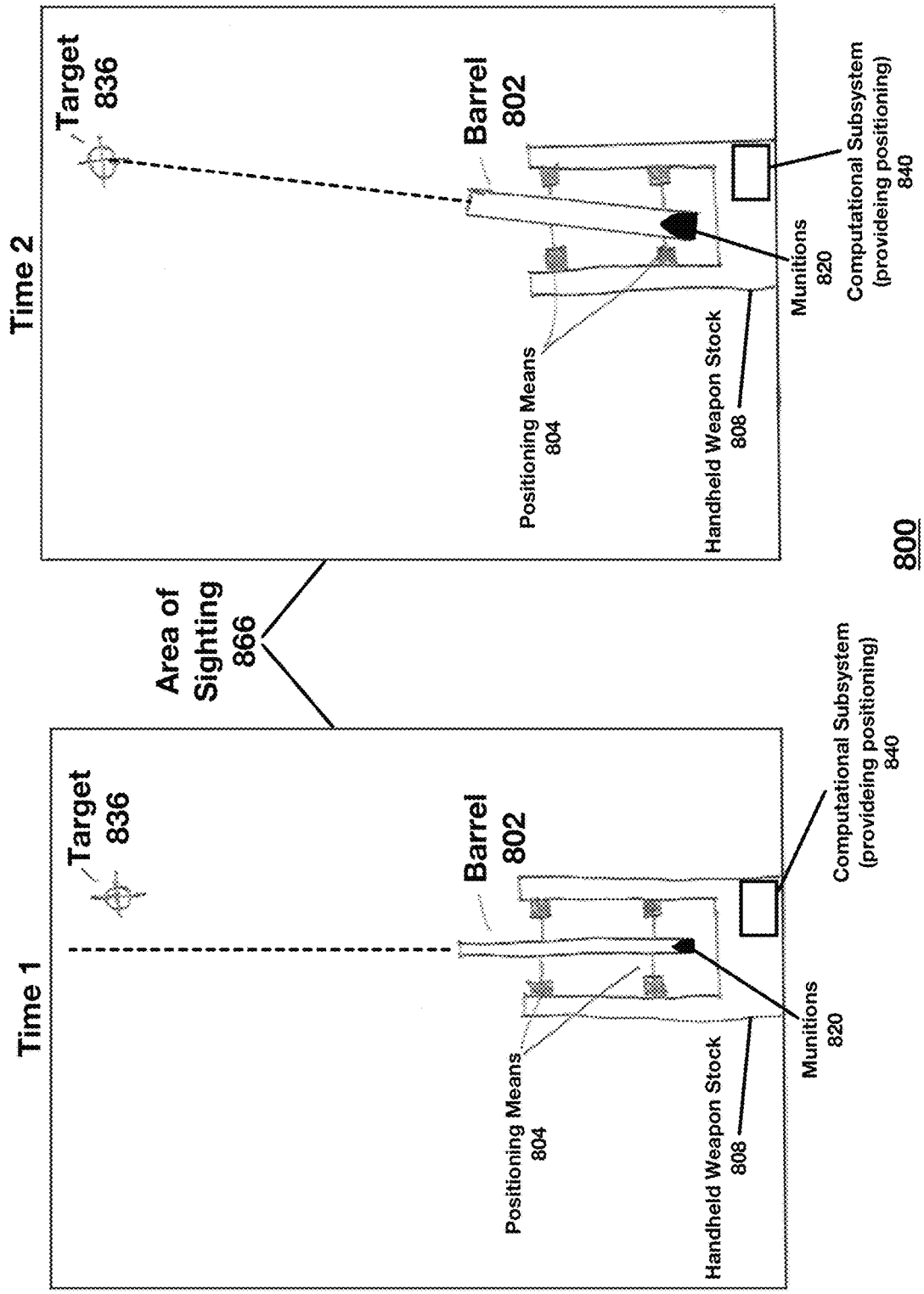
FIG. 8
Amended

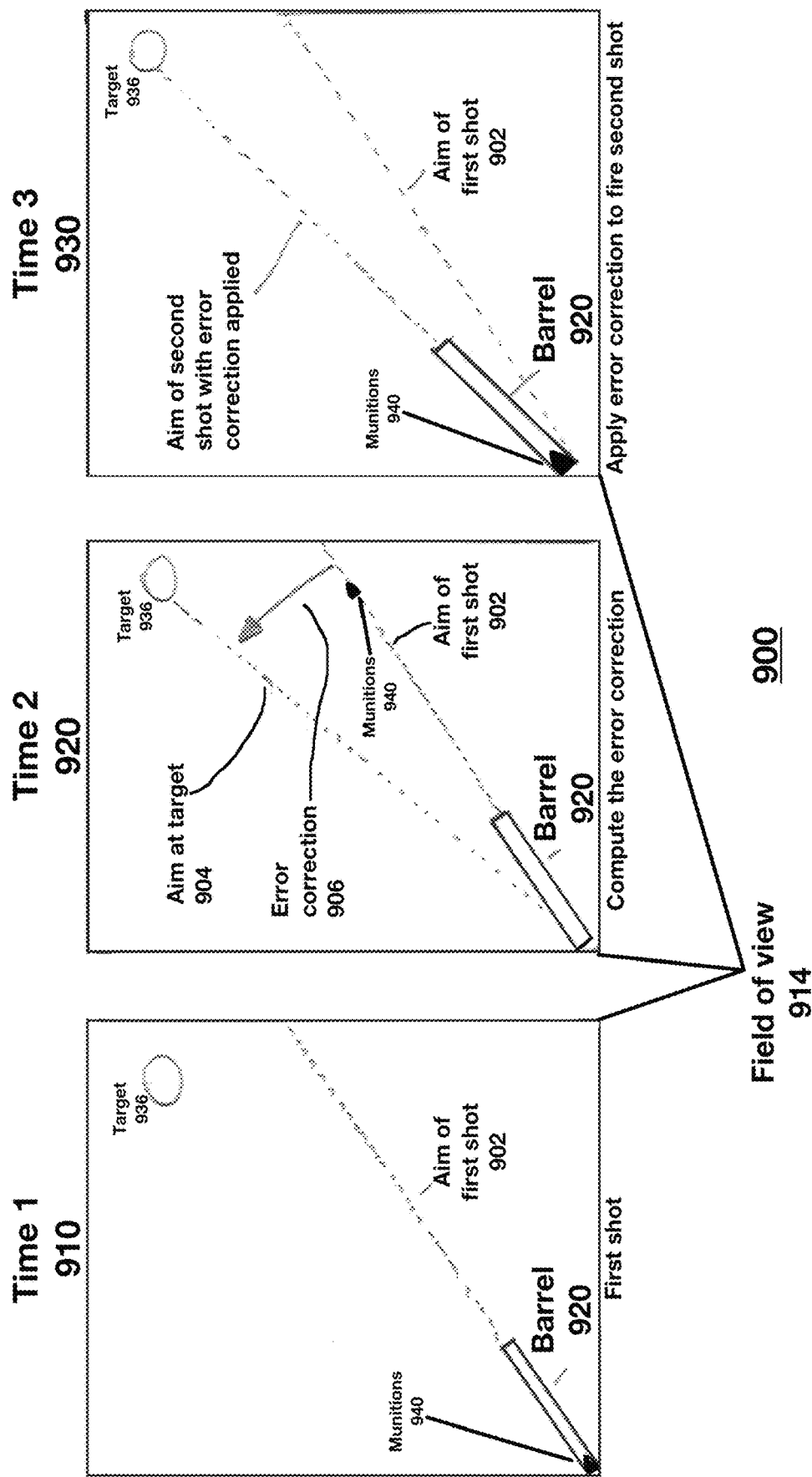
FIG. 9
Amended

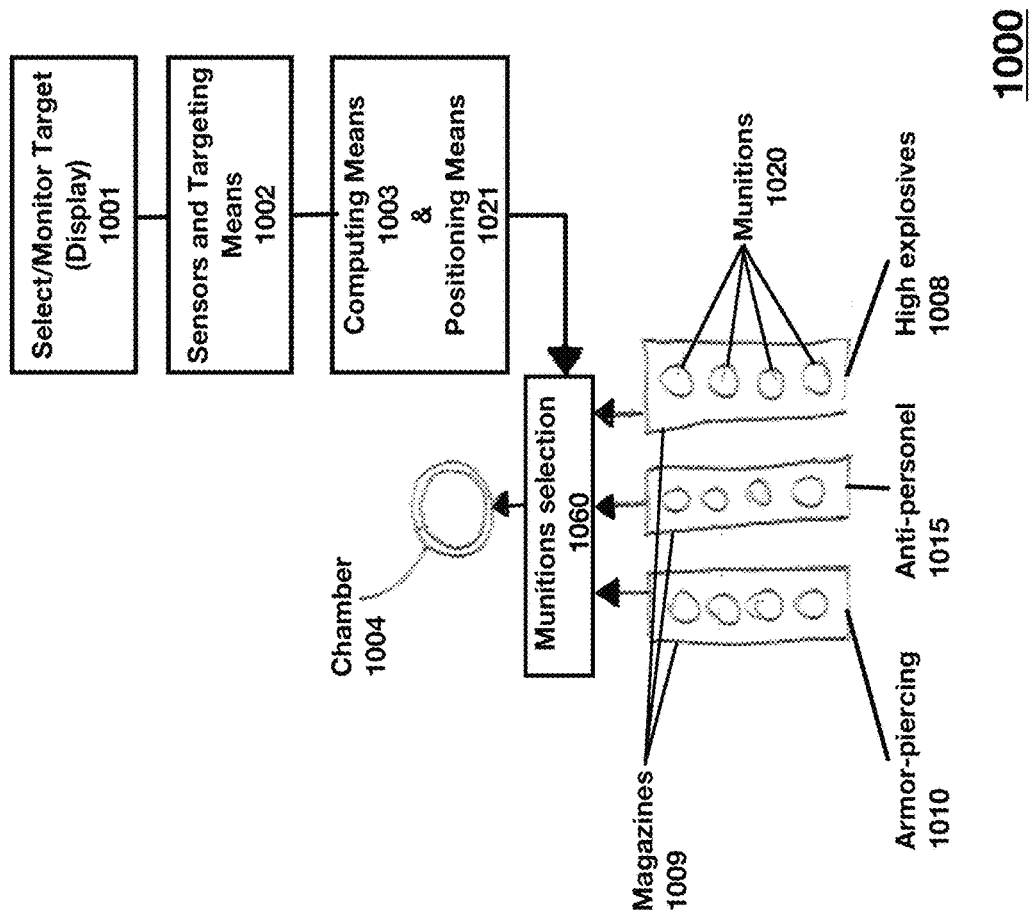
FIG. 10
Amended

| Type of munitions selected 1101 | Target type 1102 |
|---|---|
| Anti-personnel 1103 | Human 1104 |
| Armor piercing 1105 | Armored 1106 |
| High explosive 1107 | Building or Bunker 1108 |
| Manual selection of High Explosives 1109 | Human 1110 |
| Manual selection of tracer round 1111 | Range calculation 1112 |

1100

Examples of type of munitions selected based on the type of target identified

**FIG. 11
Amended**

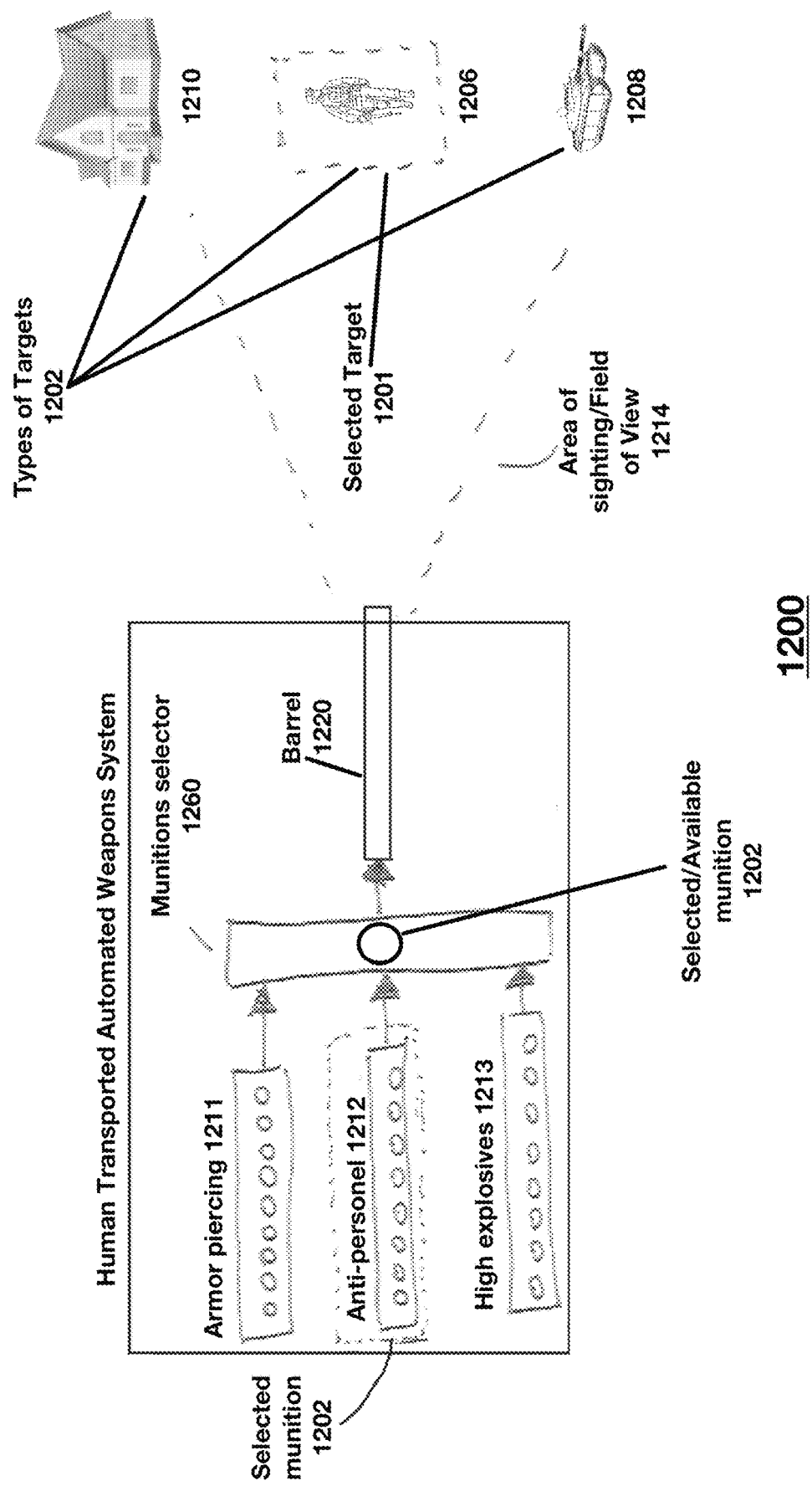
FIG. 12
Amended

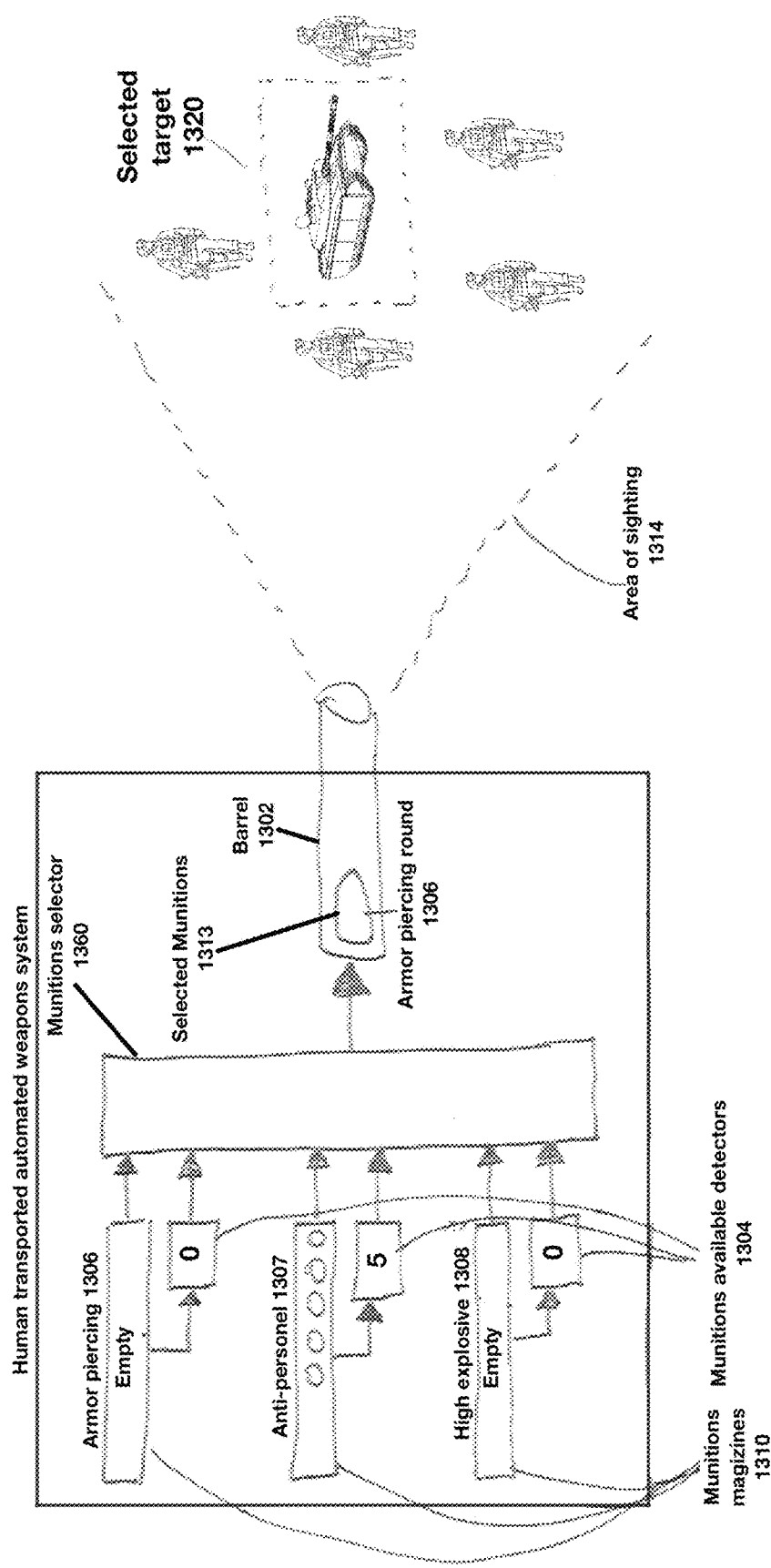
FIG. 13
Amended

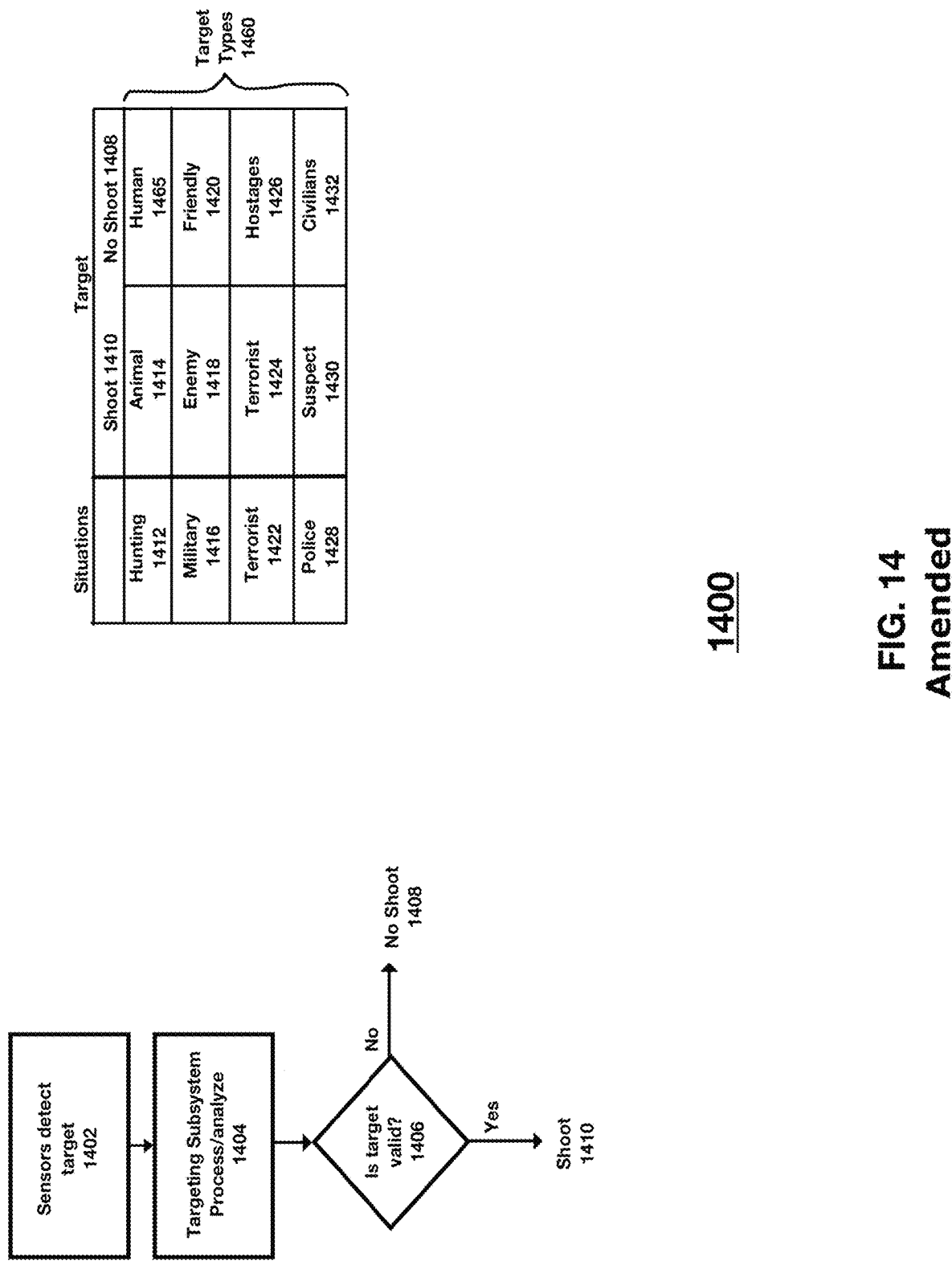
FIG. 14
Amended

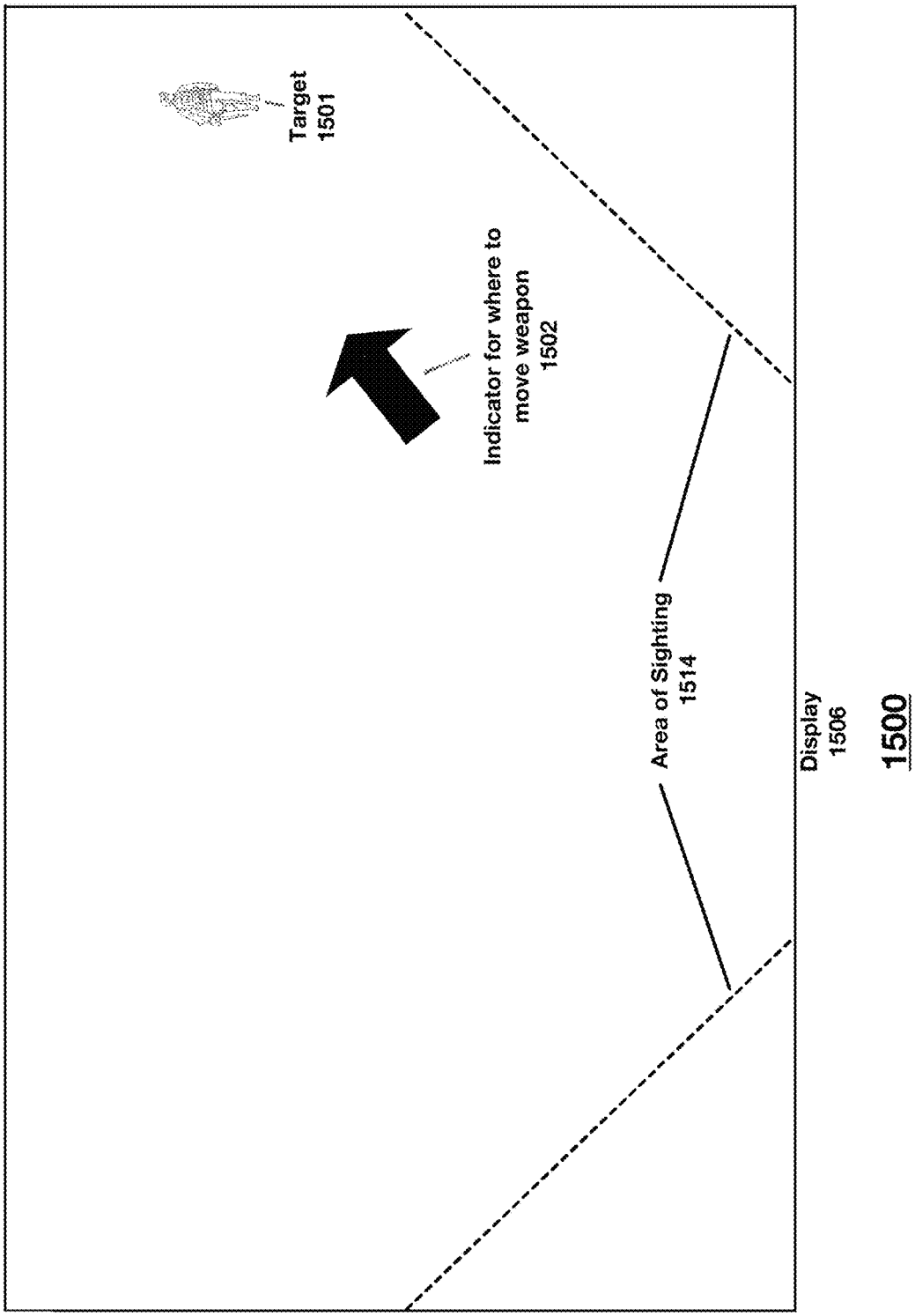
FIG. 15 Amended

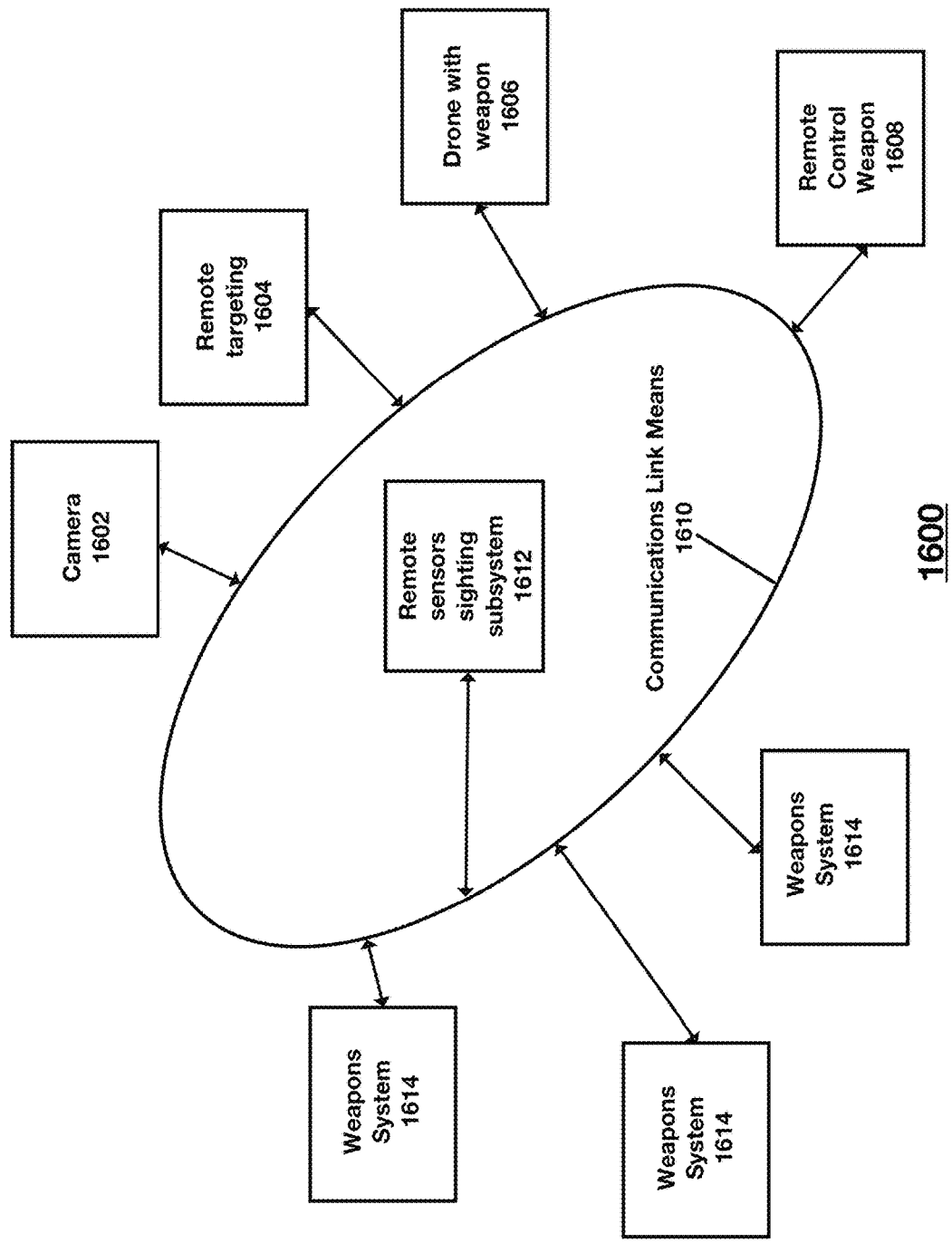
FIG. 16
Amended

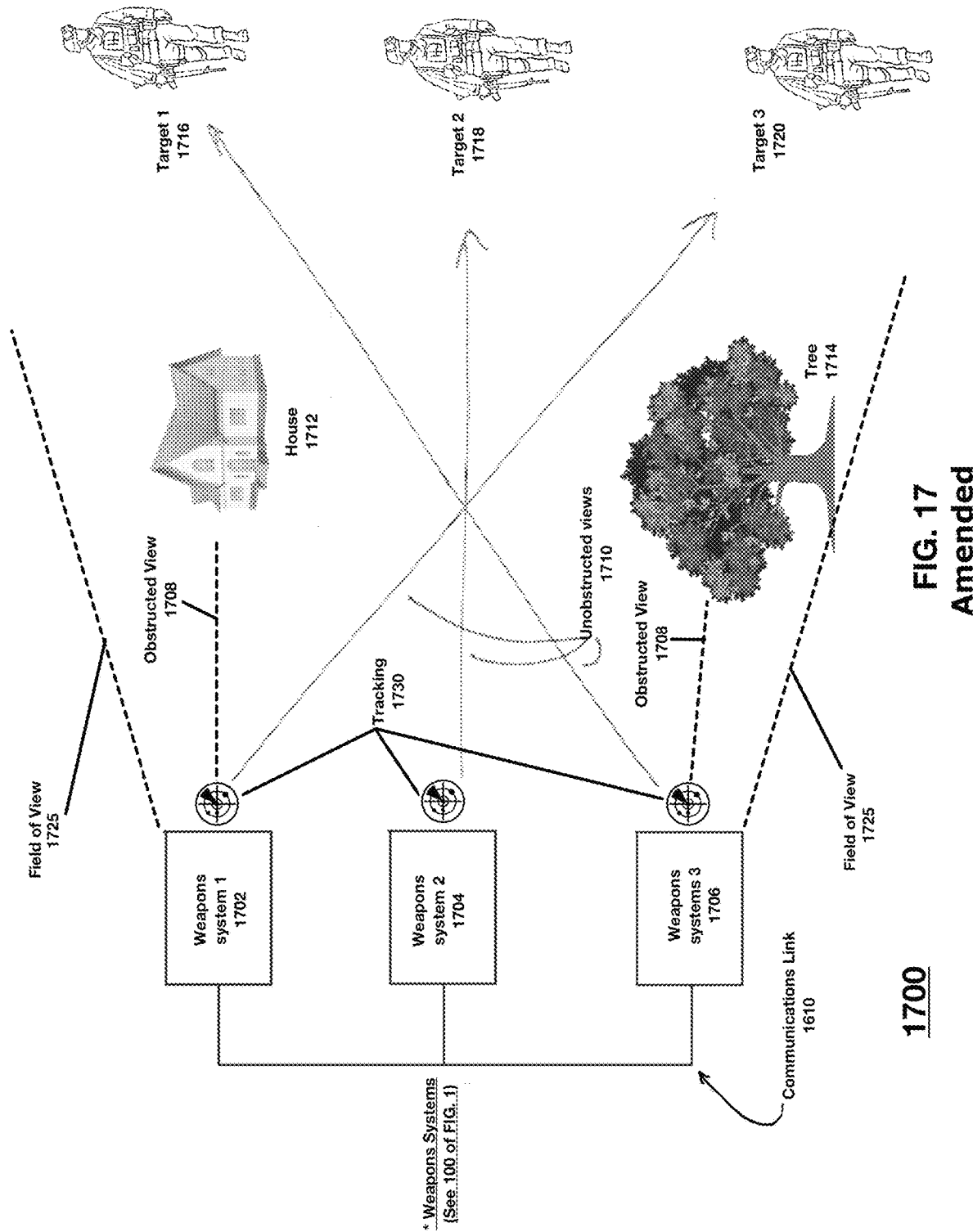
FIG. 17
Amended

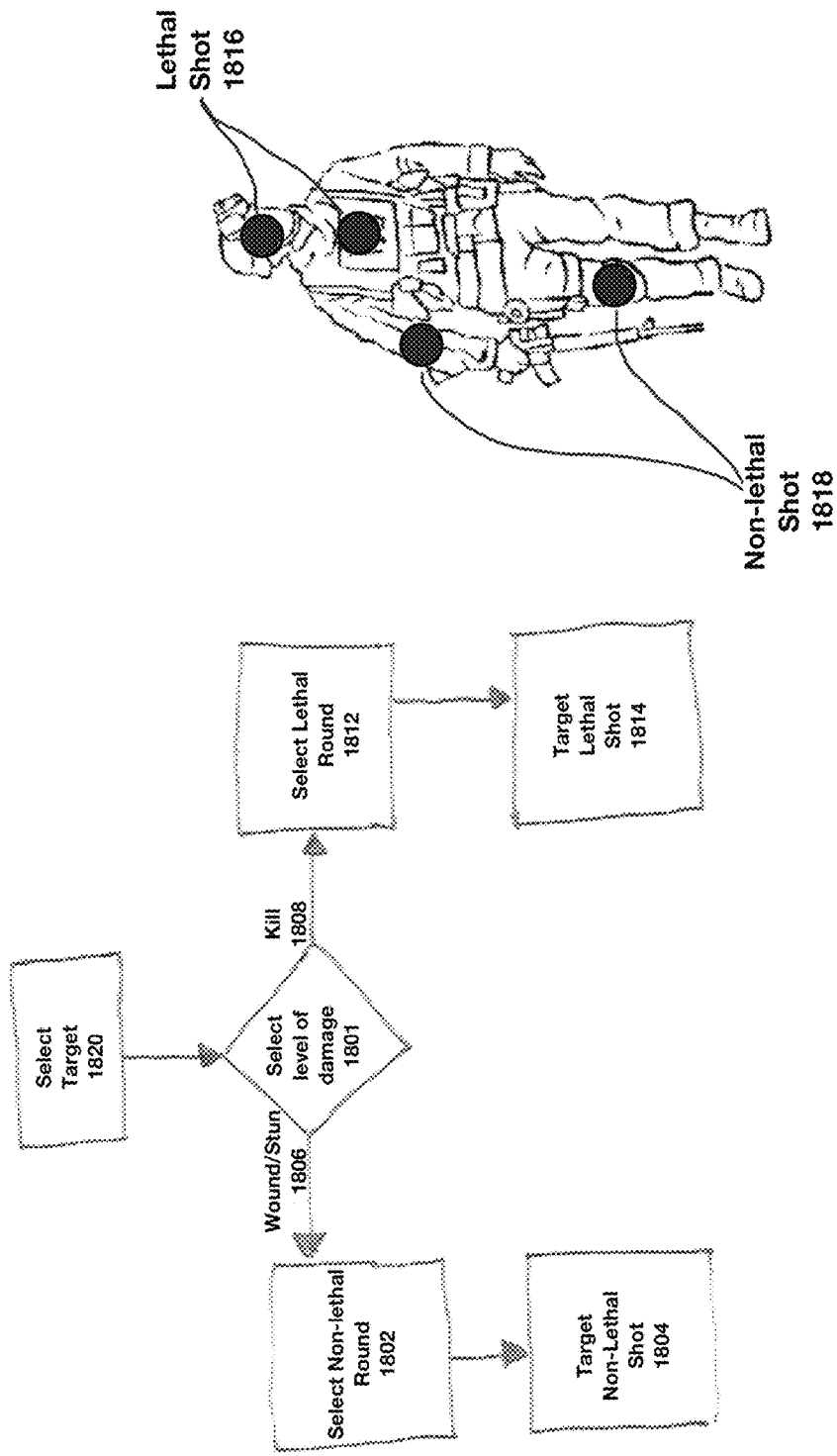
FIG. 18
Amended

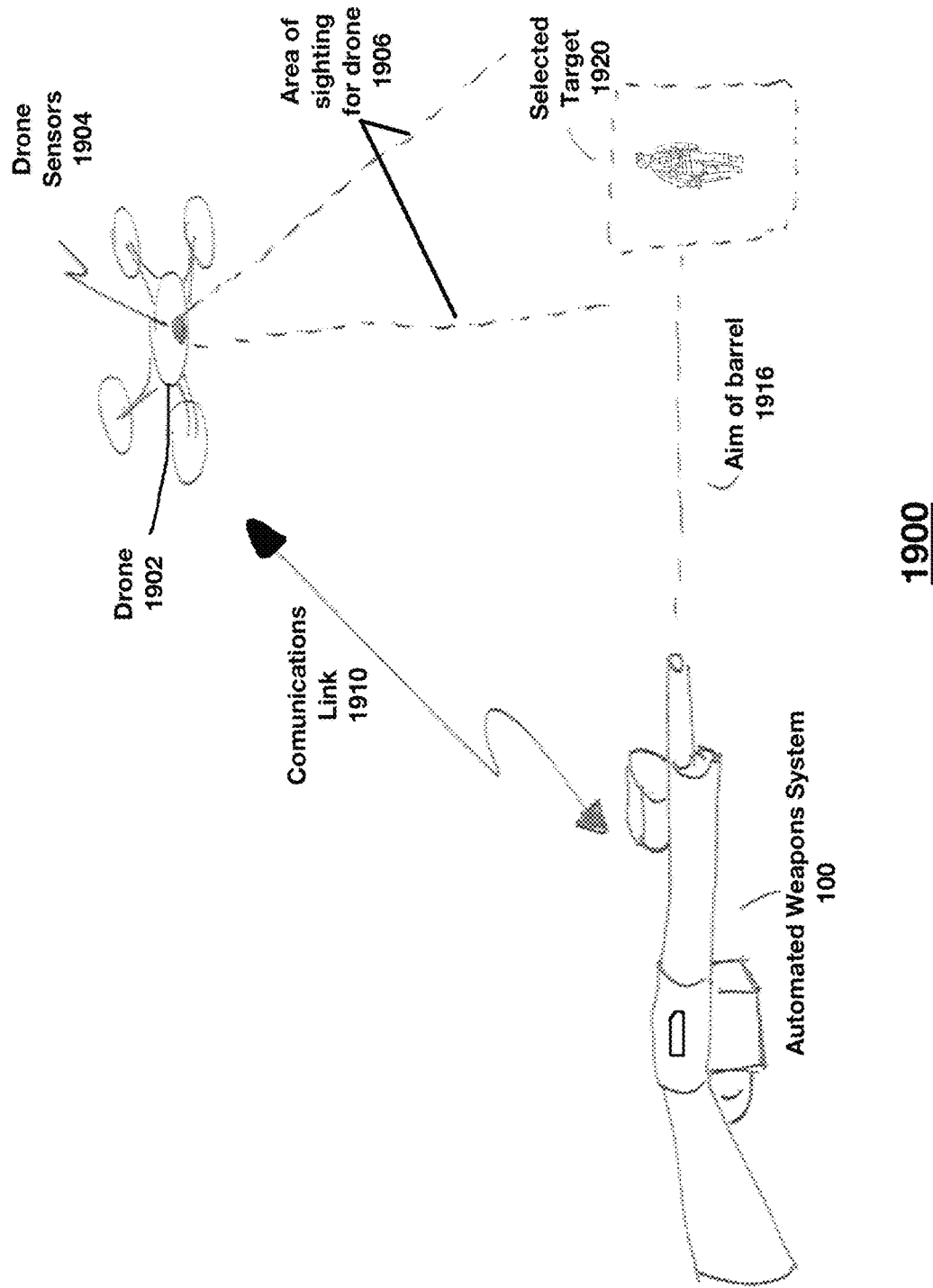
FIG. 19
Amended

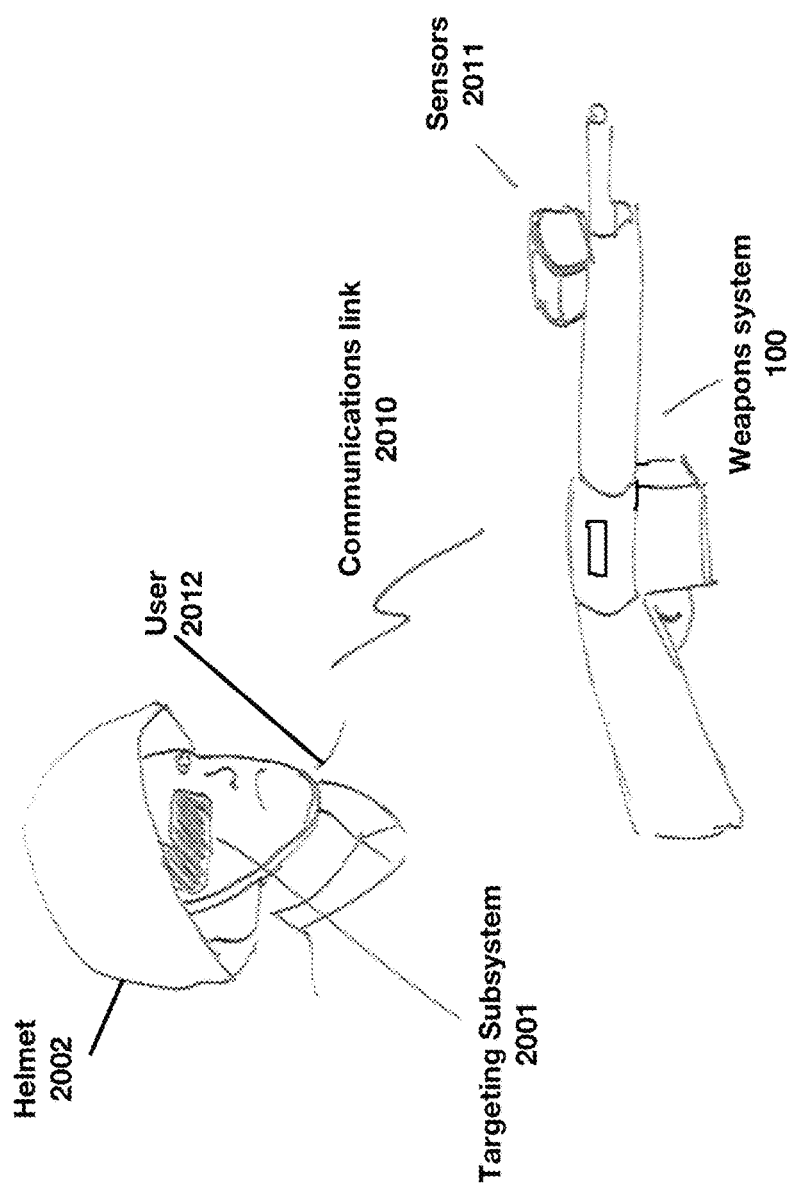
FIG. 20
Amended

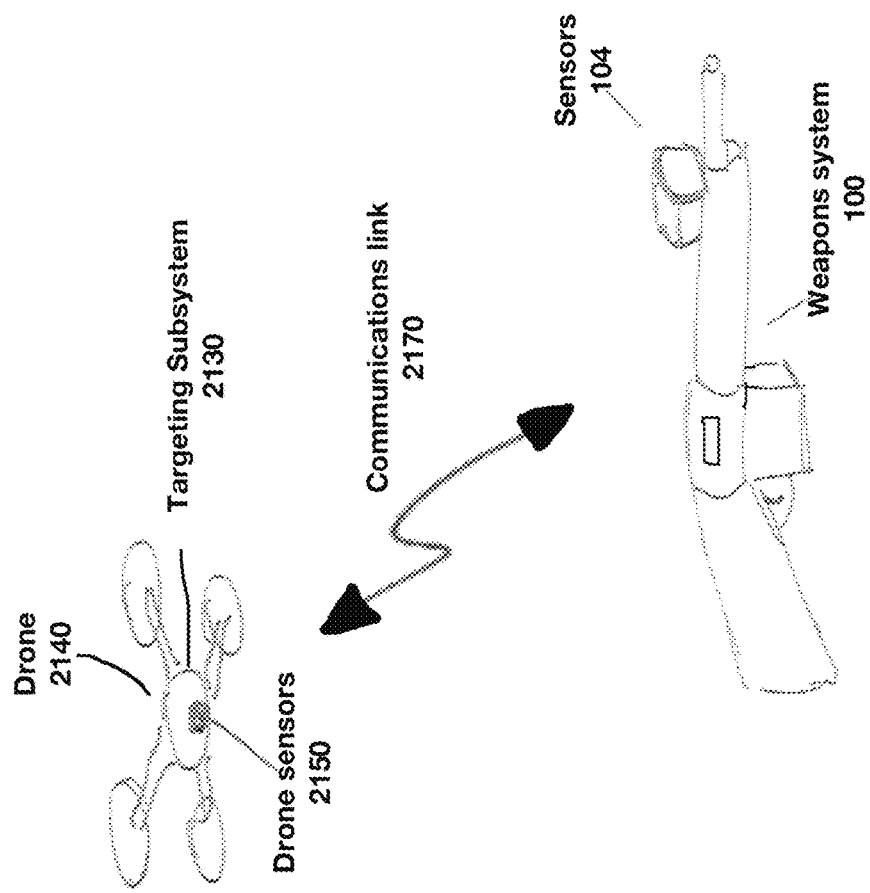
FIG. 21
Amended

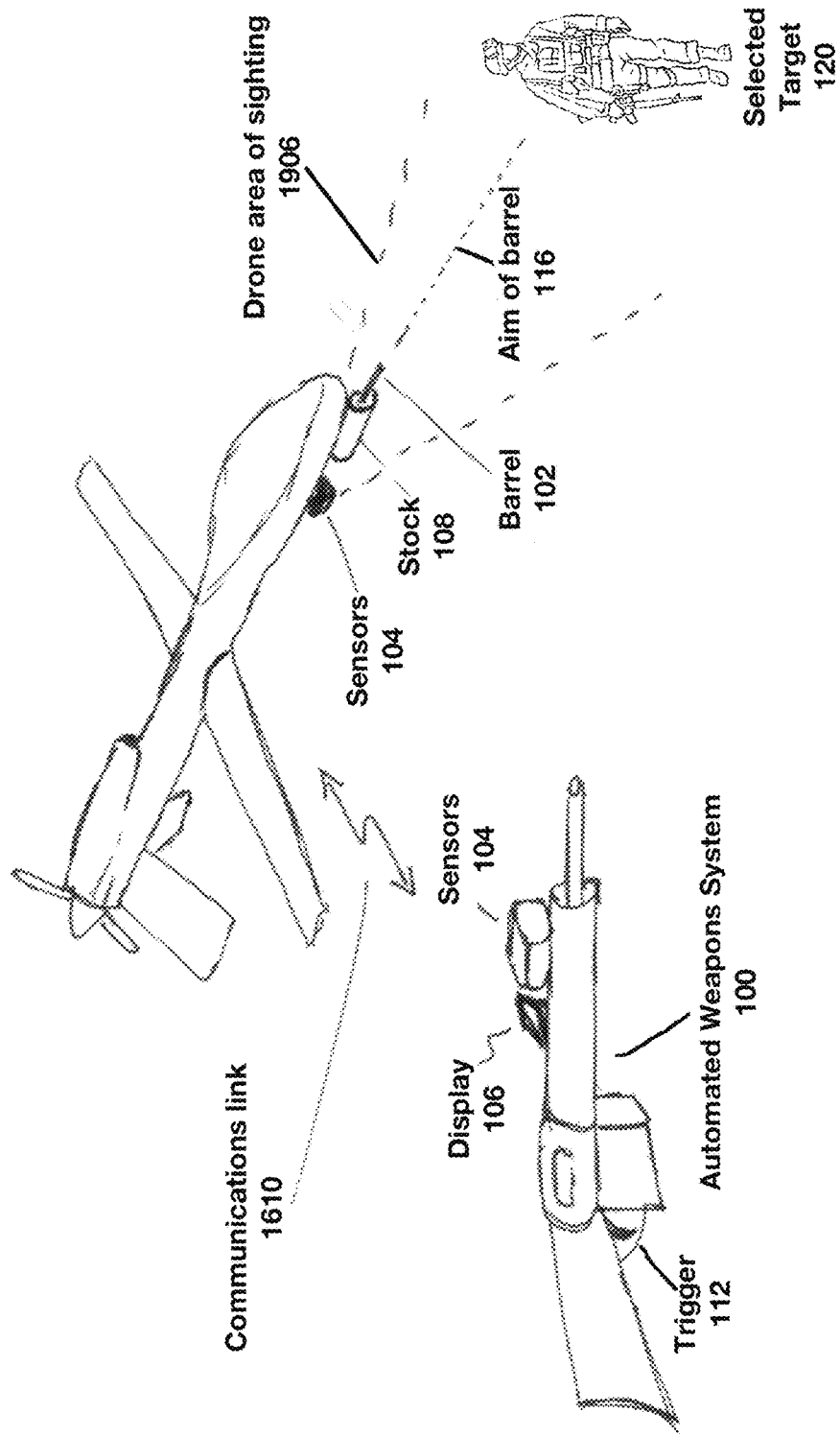

EXTERNAL SUBSYSTEM FOR AUTOMATIC WEAPON SYSTEM TO DETERMINE WHICH WEAPON HAS GREATEST PROBABILITY OF HITTING THE TARGET

BACKGROUND OF THE INVENTION

The success of traditional human transported weapons to hit intended targets has been dependent upon an individual warfighter's ability and skill to aim and control the weapon. Much training and practice is required to enable a warfighter to be skilled at marksmanship. Historically, a human transported weapon's accuracy has been limited to the operator's skill, as well as environmental factors that may obscure or complicate the shot. Because skill is involved with hitting a target with a human transported weapon, many of the shots will miss the intended target, placing a requirement of having a large supply of munitions available in a firelight. This places a burden to resupply the warfighter in the field, as well as for the warfighter to carry more munitions into a battle, which is extra weight, as well as extra cost. Further, the selection and loading of what type of munitions to use against a given target has been a time-consuming manual process, and often time is of the essence.

Utilizing the present invention enhances a warfighter's skill at being able to accurately hit an intended target, and further, assists the warfighter in target and munitions selection. This invention allows any soldiers, even a warfighter with minimal training and experience, to perform with the skill and accuracy of an expert marksman, compensating for one or more of errors in aiming, environmental factors such as distance, wind, lighting or motion, along with other extenuating factors: weather (such as rain or fog) countermeasures (such as smoke) and other factors that might otherwise interfere with making an accurate shot. Another valuable aspect of this invention is to improve the probability of hitting a target that would otherwise be missed due to movement, inaccurate aim, obscured vision, or simply a difficult shot.

SUMMARY OF THE INVENTION

An automated weapon system [preferably a human transported weapon] is comprised of a barrel, a targeting subsystem, a computational subsystem, a positioning subsystem, and, a firing subsystem. The barrel is utilized for propelling a fired munitions as aimed towards an area of sighting. The targeting subsystem identifies a chosen target in the area of sighting. The computational subsystem, responsive to the targeting subsystem, determines where the chosen target is and where the barrel needs to be aimed so that the munitions will strike the chosen target. The positioning subsystem adjusts the aim of the munitions responsive to the computational subsystem. The firing subsystem, fires the munitions at the chosen target responsive to the positioning subsystem. In one embodiment, the system is further comprised of an additional linked automated weapon having a separate barrel, separate munitions, a separate positioning subsystem, and a separate firing subsystem. The computational subsystem determines the positioning of the separate barrel to shoot the separate munitions to strike the chosen target. The additional linked automated weapon can be mounted on a stationary mount or mounted on a movable mount. In one embodiment, there is means for selecting at least one of the human transported weapon and the additional linked automated weapon, as selected and enabled to shoot the munitions at the firing time. In one embodiment, the human transported weapon is one of a plurality of weapons subsystems, and, wherein at least one of the plurality of the weapons subsystems is selected to take a best shot. In another embodiment, a respective best shot is taken by each of at least two of said plurality of weapons subsystems.

BRIEF DESCRIPTION OF THE DRAWINGS

FIG. 1 is a diagram of a weapons system with a barrel adjustable within the stock;

FIGS. 2A and 2B each illustrate an Automated Weapons System ("AWS") with automatic barrel adjustment with correction to strike a selected target;

FIG. 3 illustrates a human transported Automated Weapons System;

FIG. 4 illustrates a method for operating a human transported automatic weapons system;

FIG. 5 illustrates a "best target" selection within an Automated Weapons System;

FIG. 6 illustrates examples of factors affecting the computation of a firing solution;

FIG. 7 illustrates using a neural net for target identification, selection, and tracking;

FIG. 8 illustrates one embodiment of moving the barrel responsive to a computational subsystem by adjusting a positioning means;

FIG. 9 illustrates error correction for a second shot of munitions based upon feedback from a first shot of munitions;

FIG. 10 is a diagram of munitions selection based on target type;

FIG. 11 is a chart showing one mapping of munition types to respective targets;

FIG. 12 illustrates selection of a "best munition" for a target;

FIG. 13 illustrates selection of a "best shot" available based on remaining munitions (or chambered munition);

FIG. 14 illustrates a flowchart and some examples of Shoot/No-Shoot scenarios;

FIG. 15 illustrates an Automated Weapons System that shows a user where to move/point the weapon;

FIG. 16 is a block diagram of a system comprised of a plurality of Automated Weapons Systems with external subsystems and remote targeting;

FIG. 17 illustrates a "best target" selection for a plurality of Automated Weapons Systems linked together;

FIG. 18 is a flow chart demonstrating damage level selection;

FIG. 19 illustrates drone sensor information on the target being provided to the Automated Weapons System;

FIG. 20 illustrates the targeting subsystem as part of a helmet as separate from a human transported Automated Weapons System;

FIG. 21 illustrates the targeting subsystem as part of a drone separate from a human transported weapon; and, FIG. 22 illustrates communications between a human transported automated weapons system and a drone mounted weapons system.

DETAILED DESCRIPTION OF THE PREFERRED EMBODIMENT

While this invention is susceptible of embodiment in many different forms, there is shown in the figures, and will be described herein in detail, specific embodiments thereof with the understanding that the present disclosure is to be considered as an exemplification of the principles of the invention and is not intended to limit the invention to the specific embodiments illustrated herein.

This invention relates to improved accuracy weaponry, and providing new capabilities for human transported weapons. This invention improves accuracy over existing weapons including, but not limited to by scanning the target field with sensors, selecting a desired target (this can be by one of many means such as: nearest target, most dangerous target, the target closest to the center of the target field, etc.), identifying the type of target, selecting an appropriate round of ammunition for the target (if desired), enhancing the aim of the weapon using feedback from the targeting system by providing a correction factor from where the weapon is aimed and where the selected target is, determining if the selected target should be fired at (inhibiting friendly fire situations), and then firing at the target with the corrected aim applied. This improves the miss to hit ratio, and can also further provide selection of target appropriate ammunition for the selected target.

As illustrated in the Figures herein, an Automated Weapons System is comprised of a targeting subsystem, a computational subsystem, and a barrel with repositioning means. The targeting subsystem can utilize a variety of sensors to detect, identify, categorize, and track targets. A target can then be selected, and the barrel can be repositioned to an angle appropriate for a firing solution to strike the selected target. In one embodiment, a munition is selected for a respective selected target and/or based upon the respective munitions availability.

In one embodiment, the computational subsystem allows for the generation of an error factor resulting from a first shot from the AWS, which can be utilized to correct aim for subsequent munition firing.

In another embodiment, the automated weapons technology can be used to prevent hunting (and other) accidents because the target type can be identified. This invention can be used to prevent hunting (and other) accidents, by detecting the difference between a game animal and a human hunter. Having the weapons system identify another hunter (human) would inhibit the firing means, thus avoiding hunting accidents.

In another embodiment, not only the type of target, but specific targets can be identified. For example, a police officer's weapon could be trained to know what the officer (and/or other officers) looked like, and inhibit firing at that officer, so that the officer's weapon could not be used against the officer (or against other officers).

In yet another embodiment, with hand held weapons where the accuracy is dependent upon the stability of the user holding the weapon, the automated weapons system can provide a means to 'correct' for instabilities and inaccuracies in aiming to allow for automated correction of the 'barrel' (and/or for instructions to the user) to correct for said instabilities and inaccuracies in aiming and movement of the barrel.

This invention also relates to mobile war-fighting technology, and more particularly to enhanced weapon accuracy technology, especially for hand held weapons.

A plethora of targeting sensors allows a wide spectrum of sensing beyond the visible spectrum, such as IR, SPI (Spacial Phased Imaging), UV (ULTRAVIOLET), X-Ray, Microwave, Thermal, 3D sensor, Visible light, Radar, Sonar, LIDAR, etc. [For further examples, see the catalog on "Image Sensors", from Hamamaatsu, December, 2011).] Targeting sensors allow shooting at targets through fog, smoke, rain, and other vision obstructing conditions. This effectively provides an 'all weather/all conditions' targeting system. The sensors can also be used to identify not only a target, but the type of target. One means of doing this utilizes neural net pattern recognition means to identify the type of target (person, animal, tank, etc.)

Neural nets can be used both to identify targets, and to compute firing solutions. Alternatively, or additionally, traditional computing means, can be employed in the targeting subsystem for identifying and selecting targets. Neural nets can be used to both reduce the power used, and reduce the compute time for identifying and selecting a target.

There is literature teaching the use of neural nets in the use of target identification and tracking. For example, IBM has been working on a new hybrid technology of blending traditional computing architectures with neural nets to achieve a 'best of both worlds' processing system. This system could be utilized in the targeting subsystem for identifying targets, tracking targets and computing firing solutions.

This enhanced targeting and aiming system of the present invention can be applied to many different types of 'pointing' weapons: ballistic (gun), laser, particle, rail gun, etc.

This present invention also provides for correcting an error in aim adjustment as between where the weapon is aimed, providing a correction factor to the nearest target. Applying that correction factor by means of automated pointing adjustment can be applied to a wide range of weapons. Thus, the weapons aim can be automated in accordance with the present invention.

In one embodiment of the present invention, a targeting system selects a nearest target in a field of view. The targeting system computes a difference between where the weapon is aimed and where the nearest target is located to generate targeting correction information. The direction the weapon is aimed is adjusted based on the targeting correction information provided.

Alternatively, the targeting system can identify and lock onto a selected type of target, and then aim the weapon to fire a selected munitions at that selected type of target.

This invention also relates to enhanced weapon accuracy, and providing new features for hand held weapons to the mobile warfighter, this provides accuracy, while:

1. Not requiring the skill of becoming a marksmanship from human training, by using a deterministic automated mechanical solution (every warfighter becomes a marksman by using this weapon).
2. Improving the hit to miss ratio using computer aided targeting (thus, reducing the need for the warfighter to carry burdensome amounts of ammunition).
3. Using existing ammunition (not requiring complicated and expensive smart munitions).
4. Increasing the versatility of the weapon by automatically choosing the munitions fired based on the target type that is acquired (i.e. The weapon selects the type of munition fired based on the type of target identified).
5. Automatically selecting a 'best' target from the field of view of the weapon (i.e. The weapon chooses the best available target based on selectable algorithms, including 'nearest' target in the direction of the barrel if the weapon is not directly aimed at a target).

FIG. 1. illustrates a side view showing one embodiment of a human transported Automated Weapons System 100, comprising a display 106, sensors 104, a barrel 110 that is able to move within a stock 108 to allow aim of the barrel 110 to be adjusted while the stock 108 is held, the positioning means 155 that is moved within the stock 108 for barrel adjustment, magazines 110 holding munitions 120, and a trigger 112.

As illustrated in FIG. 1., the human transported Automated Weapons System 100 is comprised of a targeting subsystem 140 and a computational subsystem 160, which in conjunction with the barrel 110 and positioning means 155, are utilized to increase accuracy and hit-to-miss ratios. Note that as used herein, the term "barrel" refers to any means used to direct the munitions to the target. This can range from a traditional gun-munitions barrel to a propulsion means, such as a linear accelerator for a particle beam weapon, or a magnetic rail for a flechette.

FIG. 2A. illustrates a rear view of an embodiment of a human transported Automated Weapons System 200 comprising a moveable barrel 210 relative to the stock 208, aimed towards an area of sighting 230, responsive to sensors 204. A positioning means 214 within the stock 208 has its position corrected 218 by the adjusted aim of the barrel 216, and then the Automated Weapons System 200 shoots a munition 202 towards a selected target 220. The operator 260 of the human transported Automated Weapons System 200 monitors the selected target 220 through a display 206.

The target field/area of sighting 230 is scanned by sensors 204 for potential targets 270, Some of these multiple sensors 204 can include, but are not limited to IR (infrared), spatial phase imaging, laser, optical, LIDAR (laser imaging detection and ranging), etc. There is no restriction as to the type of sensors 204 that can be used in the weapons system 200. Each additional sensor 204 adds more information to determine the type of target and target selection of the selected target 220.

As illustrated in FIG. 2A., this embodiment of an automated weapons system 200 is comprised of the human transported automated weapon. The automated weapon system 200 is comprised of a barrel 210 and munitions 202 that can be aimed towards a targeting area of sighting 230 to be propelled through the barrel 210. The automated weapon system 200 is further comprised of sensing logic (sensors) 204, selection logic 255, aim computational logic 218, a positioning subsystem 214, trigger activation logic 212, and firing logic 213. The sensors 204 sense which of up to a plurality of targets are within firing range of the system. The selection logic 255 selects a selected target 220 from the targets in the targeting area sighting 230 that are within the firing range, responsive to the sensors and sensing logic 204. The aim computational logic 218 determines where to aim the human transported automated weapon 200 so that the munitions 202 will hit the selected target 220 if fired at a firing time. The positioning subsystem 214 adjusts the aim of the munitions 202 through the human transported weapon 200, to compensate as needed for where the selected target 220 is at the firing time, responsive to the computational logic 218. The trigger activation logic 212 initiates firing of the munitions 202 at the firing time. The firing logic (213) (trigger) 212 fires the munitions 202 responsive to the positioning subsystem 214 and trigger activation logic 212.

As illustrated in FIG. 2A., a method of automation of target selection and aim positioning of a human transported automated weapon 200 is comprised of a computing subsystem 250 and a barrel 210 to fire munitions 202 through the barrel 210 to propel the munitions 202 towards a selected target 220 in an area of sighting 230 of the weapon 100. The method is further comprised of identifying available targets in the area of sighting 230 and then determining the selected target 220 from the available targets in the area of sighting 230, responsive to the computing subsystem 250. The computing subsystem 250 then determines the selected target's 220 position at a firing time by positioning aim of the barrel 216 so that the munition 202 will strike the selected target 220 at the firing time. The munition 202 is then fired toward the selected target 220 at the firing time responsive to activating a trigger signal 212.

As illustrated in FIG. 2A, in one embodiment, the automated weapon system 200 is comprised of sensors 204 coupled with a computing means 250 to control adjustment 208 of an aiming means 216. The aiming means 216 mechanism is a barrel portion 210 of the automated weapons system 100 that guides a munition 202 towards an intended target 220, so as to achieve a hit on said intended target. In another embodiment, correction of aim after a first shot is provided by generating an error correction 218 and applying it to move the barrel 210 through the positioning means 214.

As illustrated in FIG. 2A., a method for operating a human transported automated weapon system 100 with a movably mounted barrel adjusted at firing for positioning of and propelling a munitions 202, also comprising computing logic 250. The method is further comprised of aiming the human transported weapon towards an area of sighting 230. At a first time 910 (in reference to FIG. 9.), a target in the area of sighting 230 is locked onto as a chosen (selected) target 220. Aim is then computed to determine where the barrel 210 needs to be aimed for the munitions 202 to strike the chosen target 220 at a firing time. A difference is calculated 218 between where the chosen target 220 is located at the firing time versus where the chosen target 220 is located at the first time 910 (in reference to the discussion hereinafter of FIG. 9.), if any. Aim is then adjusted and firing is activated at the firing time, to propel the munitions 202 at the chosen target 220 in accordance with the adjusted aim.

As illustrated and discussed in FIG. 2A., the aim computational logic an error factor 218 is computed based on sensor 204 feedback as to a difference between where the weapon 100 is aimed at time of firing versus where the selected target 220 is in the target field/area of sighting 230 at the time of firing. The error factor is utilized to compute a correction to generate a control signal at the time of firing, to adjust aim of the barrel 210 (within the stock 208) from where the weapon was previously aimed, to where the barrel should be aimed so that the munitions 202 hit the selected target 220 at the firing time.

In one embodiment, once a target 220 is selected, the computing means 250 determines an error correction (218) from where the "weapons barrel" 210 is aimed, to where the target 220 will be. This can also include compensation for environmental, motion and other factors that can affect the shot. In some embodiments, at the time of firing, the computing means 250 supplies an error or "correction" signal 218 to actuators 280 to move the weapons "barrel" 210.

In another embodiment, the Automated Weapon System 200 is activated when an accelerometer 290 detects that the weapon 200 is raised.

The type(s) of sensors 204 that can be used for this automated weapon system 200 are similar to sensors used for autonomous vehicles. [For examples of sensors for autonomous vehicles, see (https://www.sensorsmag.com/components/optical-sensors-are-a-key-technology₇ for-autonomous-car).]

In another embodiment, a "best shot" can be selected based on a mode of weapon operation. A mode of weapon operation as discussed herein, can be selected based on mission objectives. A manual mode embodiment enables the user to "force" on the weapon, a preferred mode of weapon operation. This can override an otherwise automated setting, while still allowing the automated setting of the automated weapon to assist (such as with target selection). For example, a war fighter (operator) can select "High Explosives" as the munitions, while still allowing the automatic selecting of targets (of any type of target) and providing correction to hit those targets.

In another embodiment of a fully automatic mode of operation, a war fighter can pull the trigger and sweep the weapon across a field of targets. At the time of firing for each munition, a target (e.g. a best target) is selected. In some embodiments, a best munition for the selected target is selected/prepared, and in other embodiments, the correction factor 218 (firing solution) for that target 220 is computed and applied, and then the weapon fires. Then the automated weapon system 200 proceeds to select a next available target, repeating the process as needed.

The present invention's enhanced targeting and aiming system (and methodology) can be applied to many different types of ranged weapon systems including but not limited to: projectile (firearms, railguns, etc.), directed energy (laser, plasma, microwave, sonic etc.), and non-lethal (rubberbullets, paintballs, pepper balls, etc.), handheld and otherwise.

FIG. 2B. illustrates another embodiment of the present invention, comprised of sensors 204b, selected from a plurality of available sensors 204b, used by the human transported Automated Weapons system 200. Combinations of different sensors allows for wider coverage of sensing the electromagnetic spectrum beyond the human visible spectrum. The sensors 204b can include, but are not limited to IR (infrared), SPI (Spatial phased imaging), UV (Ultra Violet), Visible light, Radar, Sonar, LIDAR, and other sensors. This wider range of coverage of the electromagnetic spectrum allows for selecting targets through fog, smoke, rain, darkness and other vision obscuring conditions, which increases the effectiveness of the user's ability to select a target 220b. In essence creating an 'all weather/all conditions' targeting system 201b within the automated weapon system 200b embodiment of FIG. 2B.

The targeting system 201b utilizes a sensing means (i.e. sensors) 204b providing sensing of potential targets 220a through environment. The sensing means 204b senses through environment 214b by means of at least one of: visible spectrum, and sensing other than just the visible spectrum, comprising at least one of IR, Spatial Phased Imaging, ULTRAVIOLET, X-Ray, Microwave, Thermal, 3D sensor, Visible light, Radar, Sonar, and LIDAR surveying technology that measures distance by illuminating a target with a laser light.

FIG. 3 illustrates one embodiment of an internal system of a human transported Automated Weapons System 300 and subsystems and components. The subsystems comprise a targeting subsystem 340, a computation subsystem 360, a firing subsystem 380, and munitions selection 390. The human transported weapon 300 is further comprised of sensors 304 providing a range 335 for the area of sighting 330, a barrel 310 within the stock 308 that is adjusted by the positioning means 355 responsive to control signals 305 from the computation subsystem 360, magazines 325, and a trigger 312.

As illustrated in FIG. 3., in a preferred embodiment, the present invention encompasses a human transported Automated Weapons System (AWS) 300, comprising a human transported weapon 300 for use by a person 301. The AWS weapon 300 is comprised of (a) a barrel 310 utilized for propelling a fired munitions 320 (as per munition selection 345) to aim towards an area of sighting 330, (b) a targeting subsystem 340 that identifies a chosen (selected) target 350 in the area of sighting 330, such as by using a neural network tracking subsystem, (c) a computational subsystem 360, responsive to the targeting subsystem 340 that determines where the chosen selected target 350 is and where the barrel 310 needs to be aimed so that the munitions 320 will strike the chosen target 350, (d) a positioning means 355 that adjusts the aim of the munitions 320 responsive to the computational subsystem 360, and a firing subsystem 380, for firing the fired munitions 320 at the chosen target 350 responsive to the positioning means 355.

In an alternate embodiment, as illustrated in FIG. 3., an automated weapons system (AWS) 300 is comprised of a human transported automated weapon 300 with inhibit+ sensor logic 304, for use by a person 301. The human transported automated weapon system 300 is further comprised of a barrel 310, a targeting subsystem 340, a computational subsystem 360, positioning means 355, and a firing subsystem 380. The barrel 310 is movable within a stock 308, utilized for propelling a fired munition 320 towards an area of sighting 330 for the human transported automated weapon system 300. The targeting subsystem 340 identifies a chosen target 350 in the area of sighting 330, the computational subsystem 360 responsive to the targeting subsystem 340, determines where the chosen target 350 is and where to aim the barrel 315 so that the munitions 320 will strike the chosen target 350. The positioning means 355 adjusts the aim of the barrel 315 responsive to the computational subsystem 360. Finally, the firing subsystem 380 fires the munition 320 at the chosen target 350 responsive to the positioning means 355.

As illustrated in FIG. 3., an automated human transported weapon can be linked to additional linked weapons (see the method in FIG. 17.). An automated weapons system (AWS) 300 is comprised of a barrel 310, a targeting subsystem 340, a computational subsystem 360, positioning means 355, and a firing subsystem 380. The barrel 310 is utilized for propelling a fired munitions 320 as aimed towards an area of sighting 330. The targeting subsystem 340 identifies a chosen target 350 in the area of sighting 330. The computational subsystem 360, responsive to the targeting subsystem 340, determines where the chosen target 350 is and where the barrel 310 needs to be aimed 315 so that the munitions 320 will strike the chosen target 350. The positioning means 355 adjusts the aim of the munitions responsive to the computational subsystem 360. The firing subsystem 380 fires the munitions 320 at the chosen target 350 responsive to the positioning means 355.

FIG. 4. is a flow chart illustrating one embodiment 400 of a method for operating a human transported Automated Weapons System 400.

A user/operator holds the human transported automatic weapons system 410.

The user then aims the weapon towards potential targets (or target) 420, initiating the targeting subsystem 300 to provide two options:
1. 430 The weapon 400 selects at least one target 350 in the area of sighting 430, or
2. 440 The user/operator selects the target 350 via the display 306 in the area of sighting 330

Depending on the selected option, the weapon then determines what adjustment of aim is needed to strike the target 450.

400 Using the computational subsystem logic 460 the weapon computes the difference between the aim to strike the target and the aim of the barrel, providing two options:

1. 470 The user can fire the weapon by pulling the trigger to activate the trigger signal, or
2. 480 The weapon is fired remotely by a remote device activating the trigger signal

490 The weapon 100 further adjusts the barrel aim responsive to a computed difference between the target aim and the barrel aim. The weapon 300 then releases munitions (499) now aimed to hit the target.

In another embodiment, as illustrated in FIG. 2. and FIG. 4., a method of automation of target selection and selected types and a best shot of a human transported automated weapon 300 (see FIG. 3.) is comprised of a barrel 310 to fire munitions 320 from and a computing subsystem 360 [400 of FIG. 4.]. The method is further comprised of identifying targets within range of an area of sighting 330 of the weapon 300 as available targets, and determining a selected target 350 from the available targets, responsive to the computing subsystem 360. The selected target's 350 position at a firing time is then determined. The aim of the weapon is positioned so that the munitions 320 will strike the selected target 350 if fired at the firing time, responsive to the computing subsystem 400. Finally, a trigger signal 312 is provided to activate firing of the munitions 320 at the firing time.

FIG. 5. illustrates automated control for a best target selection. A "best (as selected) target" 520 can be determined through multiple means, including but not limited to selecting the closest target, the target closest to where the barrel is already aiming 516, or the most dangerous threat within an area of sighting 514. In one embodiment, there are a plurality of targets (in the area of sighting 514), wherein the selected target 520 is selected from at least one said identified type of target from the identified targets. FIG. 5 further illustrates finding and identifying targets within the area of sighting 514 by selecting which of the said targets in the area of sighting 514 is the chosen target 520.

In one embodiment, target selection can be based upon a level of potential threats list.

In another embodiment, target selection is limited to targets within a range of barrel correction to assure the munition can hit a selected target.

A variety of means can be used to select a target, including but not limited to:
  the target closest to aim of weapon (or center of the field of sensor)
  the most lethal or threatening target
    the deadliest target
    the nearest target
    etc. . . .
    the best shot (easiest to hit)
    most effective (target which is most susceptible to weapon)
    by type of target
      Armor
      Human
      Bunker
      etc.
    By type of munitions available Subsequently, the chosen target is tracked to determine where the projectile needs to be aimed to strike the chosen target when fired by the automated weapon system 100.

FIG. 5. illustrates automated control of a human automated weapon system 500 that can identify a plurality of targets (in a field of view 514), select a best shot 520, adjust aim, and fire a plurality of munitions 502. The automated weapon system 100 is comprised of a computational unit 540 that has a field of view (area of sighting) 514 to aim and to fire a munition 502 as aimed within a defined range in the area of sighting 514. Up to a plurality of identified targets are identified from within the defined range and within the field of view 514 of the weapon 100. The computational unit 540 then selects the best shot from the identified targets as a selected target 520. The munitions 502 are then fired after the aim of the weapon is adjusted 516, in order to hit the selected target 520, responsive to the computational unit 540.

FIG. 6. Illustrates examples of factors affecting the computation of a firing solution 600. Factors can include wind conditions 626, motion vector 628 of the selected target 620, the difference in elevation 630 between the Automated Weapons System 100 and the selected target 620, distance 632 between the Automated Weapons System 100 and the target 620, barrel movement 634 beyond that of adjustment from the system, etc. Additional sensors 604 can provide data about the automated weapon system 100, the target 620, as well as conditions (e.g. wind, distance, elevation, motion, etc.) affecting the path of munitions 602. These sensors can include, but are not limited to range finder 632, wind velocity 626, elevation 630, ambient temperature 660, target temperature 665, accelerometer (motion vector) 628, as well as other sensors that can provide additional information that may alter the shot.

In one embodiment, as illustrated in FIG. 6., a method for use of a human transported weapon system is comprised identifying at least one said target in a field of view of a target area of the human transported weapon as a selected target, sensing and tracking the location of the selected target through environment in the target area, initiating firing of the munitions at a firing time responsive to the sensing and tracking, and adjusting aim of the munition from the human transported weapon so that the munition will hit the selected target when fired at the firing time (responsive to the determining).

Referring to FIG. 14., in accordance with one embodiment of the present invention, detection logic 1400 may be added in order to determine a "no-shoot" 1408 situation, as discussed later with reference to FIG. 14. This detection may be performed through a varied number of sensors or means including neural network 701, facial recognition, beacon detection, etc.

The targeting subsystem is responsive to sensors 714 which can be used to identify a target and to identify the type of target by coupling the sensors 704 to a neural net pattern recognition means 701 that can identify the type of target (i.e. person, animal, tank, vehicle, etc.). One way this can be done is using a 1024 Neuron Semiconductor Chip CM1K from Cognimem (http://www.digikey.com/en/product-highlight/c/cognimem/1024-neuron-semiconductor-chipcm1k). Cognimem's system can take sensor data fed to their neural net ASIC, which can be sensor data processed as discussed herein, to process the sensor data to both identify and track a target.

In a preferred embodiment, the present invention's weapon system is comprised of sensors coupled with a computing means to control adjustment of an aiming means. In one embodiment, this mechanism is a barrel portion of the weapons system that guides a munition towards an intended target, so as to achieve a hit on said target.

In another embodiment, correction of aim after a first shot is provided by generating an error correction and applying it to the barrel through the positioning means.

FIG. 7. illustrates an automated weapon system 700 utilizing a neural net system 701. The neural net system 701 can be utilized for target detection 702, target identification 777, selection 720, and/or tracking 714.

Sensor data 704 is evaluated by a computing means 740. In one embodiment, the computing means 740 includes neural net processing. Neural nets 700 can operate directly on the sensor data 704 producing outputs including, but not limited to, 'target selection', 'target priority', 'target tracking data', etc.

In another embodiment, neural nets 701 are used to increase speed [reduce the compute time] needed for identifying and selecting a target and to reduce power. In one embodiment, specific targets 702, (by type or by ID specifically) can be identified as potential threats or not. Targets that are not threats or identified as "friendly" are then removed from potential threats lists.

As illustrated in FIG. 7., a method of enhancing firing of a human transported automated weapon system is comprised of acquiring target data from sensors 714 (reference to FIG. 1.) for an acquired target from at least one to a plurality of different said targets available to select from 760, 770, 780. A computational subsystem 740 is utilized for recognizing a type of target as one of human 1106 and non-human (e.g. 1108) (from FIG. 11.) for each said acquired target 120 (reference to FIG. 1.), responsive to analyzing the target data to provide recognition of each said acquired target 120. One said target 120 is then chosen from the acquired targets 120 as a selected target 720. Firing of a munition at the selected target 720 is controlled by the automated weapon system, permitting both with or without human intervention.

FIG. 7., further illustrates a method of firing a human transported automated weapon system 100. The automated weapon system 100 (out of FIG. 1) is comprised of a computing subsystem 740, sensors 714, and a barrel 110 (from FIG. 1.) through which to fire a munition towards a selected target 720 (120) at a firing time. The method is further comprised of identifying the selected target 720 and providing for selection of the selected target 720 from available targets in a field of view 726 of the human transported automated weapon system 100. Both the sensors 714/104 and computing subsystem 740 track the location of the selected target 720 until firing time. Finally, firing is activated and the munitions are fired towards the selected target 720.

FIG. 8 illustrates two subsequent times (Time 1, Time 2) for an embodiment 800 of the human transported Automated Weapons System 100 (out of FIG. 1), which at Time 1 automatically detects an error of where the munition 820 will shoot at firing time versus where the target 836 is located at firing time (Time 2), and responsive thereto adjusts aim of where the munition 820 will strike when fired.

The barrel 802 is responsive to the computational subsystem 840 and provides adjustment by the positioning means 804. The positioning means 804 can be mechanical, semi-automatic, and/or automatic and can utilize actuators of varying types (i.e. electrical, thermal, magnetic, mechanical, pneumatic). The barrel 802 can refer to the exiting path for a multitude of weapons systems, including but not limited to: projectile (firearms, rail-guns, etc.), directed energy (laser, plasma, microwave, sonic etc.), and non-lethal (rubber-bullets, paintballs, pepper-balls, etc.). This embodiment of system 800 can be applied to human transported automated weapon systems 100, mobile automated weapon systems [such as drones (air, ground, etc.)], and traditional mounted weapons. A major benefit of the present invention is that it can utilize preexisting munition packages and as such, does not require changes to the munitions supply chain.

As illustrated, FIG. 8., shows a human transported automated weapons system 100 (in reference to FIG. 3.), is comprised of a targeting subsystem 340, a computational subsystem 360, and a firing subsystem 380, and processing logic and a barrel 310 that is movably mounted within a stock 308. The barrel 310 is movable for positioning 315 of and propelling a projectile (e.g. munition) 320. The system is further comprised of a targeting subsystem 340 aiming towards an area of sighting 866, and locking onto at least one target 836 in the area of sighting 366 as a chosen target 836, responsive to the processing logic. The computational subsystem 840 determines where the projectile 820 needs to be aimed to strike the chosen target 836 and computes a difference between where the projectile (munitions) 820 needs to be aimed to strike the chosen target 836 and where the barrel 802 is aimed at the firing time, responsive to the processing logic. The computational subsystem 840 then adjusts the position of the barrel 802 within the stock 808, responsive to the computing the difference. Finally, the firing subsystem 380 activates the firing of the projectile 820 so as to propel the projectile 820 through the barrel 802 at the chosen target 836.

FIG. 9. Illustrates generation of an error correction (900) as follows:
  a) At time 1, 910, the aim of the first shot 902 is fired, and the trajectory is such that the target 936 was missed.
  b) At some later time 2, 920, the system computes an error correction 906, based on the sensor 104 feedback on the current position of the target 136 and the sensor 104 feedback on the location (error correction, 906) that resulted from aim of the first shot 902.
  c) At a later time 3, 930, the computed error correction 906 is applied to generate a control signal to cause the barrel 920 to be adjusted 908.

FIG. 9., illustrates a method of utilizing a human transported automated weapon system 900 for firing a munition through a barrel aimed towards an identified target with aim adjustment and tracking for a second firing. The method is comprised of: choosing a selected target 936 from a plurality of targets in a field of view 914 of the human transported automated weapon system 100, as the selected target 936. Aim of the barrel 920 is adjusted by comparing where the selected target 936 is located versus where the barrel 920 is aimed so that when fired, the munitions 940 will hit the selected target 936. The munitions 940 are fired at the selected target 936 at a first firing time 910, responsive to adjusting the aim of the barrel 920. The munition 940 is tracked after it is fired at a first time 910, to generate tracked munitions data (error correction) 906. The selected target 936 is tracked after the munition 940 is fired to generate tracked target data (error correction) 906. A modified aim adjustment 908 is then provided, responsive to the tracked munitions data and the tracked target data (error correction) 906. Finally, after modifying the aim adjustment 908, another munition 940 is fired at a second firing time 930 to hit the selected target 936.

As illustrated in FIG. 10., the Automated Weapons System 100 can have multiple magazines 1009 with different respective munitions 1020 types and a munitions selector 1060. The munitions selector 1060 responsive to the sensors 1002 and targeting subsystem 1002, allows for a round 1010, 1015, 1008 of one type of munitions 1020 to be chambered 1004. Then, at a later time after the first round was either expended or returned to the respective munitions magazine 1009, the munitions selector 1060 can chamber 1004 a round of munitions of another type. For example, at time t1, an anti-personal round 1015 can be chambered 1004, and after the weapon is fired a subsequent high explosive round 1008 can be chambered 1004.

In accordance with another embodiment of the present invention as illustrated in FIG. 10., the operator of the automated human transported weapons system 100 selects and monitors the target via the display 1001 responsive to the targeting subsystem 1002. Subsequently, after gathering information from the targeting subsystem 1002, the computational subsystem 1003 sends control signals to adjust the positioning means 1004. The munitions selection 1060 logic selects the type of munition 202 for the selected target 220, initiating the trigger 212 by means of the firing subsystem to fire the munition 1020.

The targeting subsystem 1002 selects a selected target 220 from a plurality of identified targets in the area of sighting 230.

FIG. 11. illustrates a chart 1100 providing a mapping of a few possible types of munitions 1101 paired to their respective target types 1102. For example, where the target type is a human 1110, the type of munitions selected, responsive to sensors and the targeting subsystem, can be but not limited to anti-personnel 1103, armor piercing 1105, and/or high explosives 1107. At the time of firing, the computing means can also select the appropriate munitions for the type of targets selected such as:

antipersonnel munitions 1103 for human combatants 1104
armor piercing munitions 1105 for armor targets 1106
high explosive munitions 1107 for structures (buildings), or bunkers 1108
etc.

In accordance with one aspect of the present invention, the automatic munitions selection can be overridden and manually selected. For example, a manual selection of high explosive munitions 1109 can be chosen for human targets 1110. Range 1112 can also be calculated by manually selecting a tracer round 1111 to acquire data to improve accuracy of the shot of the munitions.

As illustrated in FIG. 11., a method of operating an automated weapons system 100 (as illustrated in FIG. 3.) is comprised of a sensing subsystem 304, a munitions subsystem 390, a targeting subsystem 340, a computational subsystem 360, positioning means 355, and a firing subsystem 380. The sensing subsystem 304 provides target data (of the target type) 1102 for at least one acquired target (chosen target type) 1102, responsive to at least one sensor 304. The munitions subsystem 345 provides from one to a plurality of types of munitions 1101 as available munitions 320. The targeting subsystem 340 provides recognition of a type of target 1202 for each acquired target 1102. The computational subsystem 360 selects a chosen target type 1102 from the acquired targets based on at least in part on the types of said munitions 1101 available. A type of munition 320 is selected to be a selected munition 1101 after determining if the munition 320 is effective for the chosen target type 1102, responsive to the computational subsystem 360. The positioning means 355 then adjusts the aim of the selected munition 1101 so that it will hit the chosen target type 1102. Finally, the firing subsystem 380 fires the selected munitions 1101 through a barrel 310 at the chosen target 1102.

As illustrated in FIG. 5. and FIG. 11., target selection (validation) can be obtained from potential targets by using a variety of means to determine whether a target is a threat or harmless. Target selection can utilize multiple factors such as the distance closest to the "aim of weapon" (or center of field of sensors), the most threatening targets (labeling threats as most dangerous or closest to war fighter), the best shot available for the war fighter to take (easiest to hit), the most effective target that is most susceptible to the weapon (depending on available munitions and target's armor); etc.

Once the target 120 is selected, computing means 400 determine the error correction from where the "barrel" 102 is aimed, to where the target will be. This can include compensation for environmental, motion, and other factors that can affect the shot.

At time of firing, the computing means 400 supplies "correction" signals to actuators to direct the weapon "barrel" 102 to a designated spot 1816/1818 on the target. The designated spot 1816/1818 on the target 120 can be selected to inflict damage ranging from lethal 1816 to stun 1818 (incapacitate).

At time of firing, or at time of' new target acquisition, the computing means 400 also selects the appropriate munitions 202 per the type of target selected. Appropriate munitions 1104 could account for armor piercing for armored targets, anti-personal for humans, high explosive for structures, etc.

As illustrated in FIG. 5 and FIG. 11, at firing time, "a best shot" will be selected based on the mode of weapon operation 1200. The mode of operation 1200 can be selected based on mission objectives. A manual mode 212 is also available to "force" a preferred mode of weapon operation. This can override the automatic setting, while still allowing the automated weapon system to assist with target selection. For example, the warfighter (operation) can select high explosives" as the type of munitions 212, while still automatically selecting targets 120 (of any type) and correcting to hit those targets.

As illustrated in FIG. 11., in a full-auto mode of operation, the warfighter can pull the trigger and sweep the weapon across a field of targets. Sequentially, at each time of firing for each munition, a target (best target) is selected, a best munition for the selected target 120 is prepared, and a "correction" factor 118 for that target is then computed and applied. Finally, the automated weapon system 100 fires a munition 202 and then proceeds to select a next available target 120 repeating the process as needed.

FIG. 12. illustrates, a human transported automated weapon system 200 (as in FIG. 2A., comprised of a computing subsystem 250, sensors 204, and a barrel 210) (barrel 1220 in FIG. 12.), with a plurality types of munitions 1211, 1212, 1213, a decision subsystem and aim adjustment 218. The automated weapon system 200 has storage for storing up to a plurality of types of munitions 1211, 1212, 1213 that can be fired through the barrel 1220, responsive at least in part to the computing subsystem 250 and the sensors 204. The identifies and provides for the selection of a selected target 1206 in a field of view (area of sighting) 1214 of the human transported automated weapon system 100. The sensors 204 then track the location of the available targets in the field of view 1214 of the automated weapon system. At least one of a plurality of types of munitions [for example, 1211 (armor-piercing), 1212 (anti-personnel), 1213 (high-explosives)] are available to select from. Sensors 204 gather and analyze target data to provide recognition of the type of targets 1202 available to choose from. The selected target 1206 is then chosen from the types of targets 1206, 1208, 1210 available, based on the type of munitions 1211, 1212, 1213 available. Munition selection is determined by selecting the munition type 1203 that best matches the selected target 1201. Sensors 204 locate where the selected target 1201 is at a firing time in order to fire the selected munition 1203. Finally, aim is controlled and adjusted 218 (see for example, FIG. 2A) for the human transported weapon at the firing time so that the selected munition 1203, as fired, will strike the selected target 1206.

As illustrated in FIG. 12., an automated weapons system is comprised (from FIG. 3.) of a sensing subsystem 304, a munitions subsystem 390, a targeting subsystem 340, a computational subsystem 360, positioning means 355, and a firing subsystem 380 to assist in tracking and eliminating targets through recognition and munitions selection. The sensing subsystem 304 provides target data for at least one acquired target, responsive to at least one sensor 304. The munitions subsystem/selector 1260 provides selection of one from up to a plurality of types of said munitions 1211, 1212, 1213 as available munitions 1202. The targeting subsystem 340 provides recognition of a type of target 1202, for each said acquired target, responsive to the target data. The computational subsystem 360 selects a chosen target 1206 from the acquired targets, based on at least in part on the types of said munitions 1211, 1212, 1213 available, and selects a type of munition 1260 that is determined effective as a selected munition 1202 for the chosen target 1206. The positioning means 355 function to adjust the aim of the selected munition 1203 so that it will hit the chosen target 1206. Finally, a firing system 380 fires the selected munitions 1203 through a barrel 1220 at the chosen (selected) target 1201.

As illustrated in FIG. 12., in one embodiment a most appropriate round for a selected target 1206 in the area of sighting 1214 of the Automated Weapons System can be chosen as the selected munition 1202. For example, where the selected target 1206 is that of a bunker 1210, the automated weapon system can chamber 1004/1260 a round 1211, 1212, 1213 respective to that target type, such as a high explosive round 1213. If the selected target is instead a hostile human combatant 1206, an anti-personnel round 1212 can be chambered 1203/1260. In a third possible scenario, wherein a hostile tank 1208 (armored target type) is the selected target 1206, an armor piercing round 1211 is chambered 1203/1260. As shown in FIG. 12, the automated weapons system 100 chambers 1004/1260 a round 1211, 1212, 1213 respective to a respective target type 1102 (from FIG. 11.), such as an anti-personnel round 1212.

As illustrated in FIG. 12., (also referring to FIG. 3.) a human transported automated weapon system is comprised of sensors 304, a computational subsystem 360, target selection logic 340 for choosing a selected target 1201, munitions selection logic 390 with a plurality of types of munitions, a positioning subsystem 355, and a firing subsystem 380. Sensors 304 determine which of a plurality of types of munitions are available for the automated weapon system. The computational subsystem 360 acquires target data from the sensors 304 for at least one up to a plurality of the targets, each as an acquired target. The target data is then analyzed to provide recognition of each said acquired target as a specific type of target 1206, 1208, 1210 (e.g. person, tank, building). The target selection logic 340 chooses a selected target 1201 from the acquired targets based on current availability of the types of targets 1206, 1208, 1210 recognized. The munitions selection logic 1260 chooses a selected munition 1203 from up to a plurality of the types of the munitions 1211, 1212, 1213 available, based upon the selected target 1201. The positioning subsystem 204 adjusts the aim of the weapon so that the selected munition 320 (1203) will hit the selected target 1201 when fired. Finally, the firing subsystem 380 fires the selected munition 1202 at the selected target 1201 at a firing time.

In FIG. 13., an example is provided wherein an armor piercing round 1306 (206 from FIG. 2.) is already chambered. The targeting subsystem 300 identifies a chosen target 120, from up to a plurality of types of targets 1202 in the area of sighting 114. The munitions selection logic 600 chooses a type of munitions 1104 specific to the said target type 1202 of the selected target 120. The computational subsystem 400 responsive to the targeting subsystem 300, determines where the selected target 120 is and where the barrel 102 needs to be aimed so that the selected munitions 202 will strike the target 120. The Automated Weapons System 100 can determine the best available shot based on the current round 202 chambered 124, and/or on the remaining rounds (of munitions) 202 available in a munitions magazine 110, as sensed by a munitions available detector 1304.

FIG. 13. further illustrates an embodiment of a system and method of operating a human transported weapon comprised of: (100's are in reference to FIG. 1.) a computational system 160 that has from one up to a plurality of different types of munitions 1306, 1307, 1308 available to select from. Target data is acquired from sensors 104, for an acquired target, for at least one to a plurality of different said targets available to select from. Target data is analyzed in order to recognize each acquired target in accordance with their target type (1102 from FIG. 11.). Munition availability 1304 is determined for the human transported automated weapon system 100 to choose a selected target 1320 from the acquired targets. After determining which type of munition 1306, 1307, 1308 is available, an appropriate munition is selected 1360 based on the type of target 1102 (from FIG. 11.) of the selected target 1320. The human transported automated weapon system 100 fires the selected munition 1313 at the selected target 1320 after the aim of the automated weapon system is adjusted to assure that the selected munition 1313 hits the selected target 1320.

In another embodiment, as illustrated in FIG. 14., an automated weapon system 100 (100's are in reference to FIG. 1.) provides the ability to engage or disengage firing, with the addition of a process which determines if the situation is shoot 1410 or no shoot 1408 situation.

FIG. 14. illustrates a shoot/no-shoot scenario flowchart 1400, where an Automated Weapons System 100 first detects a target 1402, then a computational subsystem 160, and/or a detection logic 1404 processes and analyzes the target information in order to determine if the target is valid 1406.

If the selected target is not valid, then a no shoot scenario 1408 is activated. The no shoot scenario 1408 can be as simple as an alert delivered to the user, or the automated weapons system 100 can inhibit the activation of a firing sequence.

In an alternative embodiment, the no shoot scenario can prevent mass shootings at designated targets (target types), such as human 1465, or shootings for all target types 1102, to inhibit firing of the weapon.

In another embodiment, the target type 1102 (from FIG. 11.) is identified and used to inhibit firing (no shoot) 1408 (from FIG. 14.) of the automated weapon system at a certain designated target type(s) 1102. This is useful in many alternative embodiments, as shown in the target types table 1460, such as to prevent hunting accidents 1412, where with the present invention, the firing of the automated weapon system is inhibited if the target type 1102 is a human 1465 or other certain designated target type(s) 1102.

In another embodiment, in a law enforcement situation, police 1428 can utilize the Automated Weapons System 100 to determine if a selected target is a civilian 1432 or is another policeman officer 1428, rather than a suspect 1430, to inhibit firing as appropriate.

In addition, in a military situation 1416, soldiers can identify who is an enemy 1418 or who is friendly 1420. Similarly, for a terrorist situation 1422 (left column of table), the automated weapon system 100 distinguishes whether to shoot a terrorist 1424 (middle column of table), and avoids shooting hostages 1426 (right column of table).

Since the selected target type 1102 can be identified (friend, foe, animal, vehicle, etc.) indicating if the target is valid 1406 can prevent hunting accidents and friendly fire.

The user can then specify what type of munitions 1101 (e.g. anti-personal, armor piercing, etc.) to use for the selected valid target 1410. Thus, the automated weapon system can determine the difference between: a game animal 1412 and another hunter 1412, or between an ally 1420 and an enemy combatant 1418, or between a truck and a tank 1106 (armored), etc. which provides the ability for the user (or automated weapon system 100) to respond accordingly.

FIG. 14. illustrates an embodiment of the present invention, where detection logic 1400 determines a "no-shoot" (1408) situation as discussed herein. This detection can be performed through a varied number of sensors and means, including but not limited to via neural network 701, via facial recognition, via beacon detection, etc.

The targeting subsystem 1404 is responsive to sensors 104 which can be used to identify a target 120, and to identify the type of target 1460 by way of coupling the sensors 104 to a neural net pattern recognition means 701 that can identify the type of target (i.e. person, animal, tank, vehicle, etc.). As discussed earlier herein, one way this can be done is using a 1024 Neuron Semiconductor Chip CM1K from Cognimem (http://www.digikey.com/en/producthighlight/c/cognimem/1024-neuron-semiconductor-chip-cm1k). Cognimem's system can take sensor data fed to their neural net ASIC, which can be sensor data processed as discussed herein, to process the sensor data to both identify and track a target.

As illustrated in FIG. 15., an automated weapon system 100 with a display 1506, is responsive to sensors 104 (from FIG. 1.) within an area of sighting 1514 to show the user where to point the weapon 1502 in order to select, identify, track, and/or engage a target 1501. A simple arrow type cursor 1502 can be utilized, which indicates 1502 and displays 106 the direction 1502 to which the barrel (102 from FIG. 1.) should be pointed, when the physical limitations of the system are reached.

FIG. 16. illustrates an embodiment comprised of a plurality of automated weapons 1614 linked through a communication means 1610 with one another, by means of external subsystems 1600. The external subsystem 1600 comprises at least one of (but is not limited to one) remote targeting subsystem 1604, a camera (moveable, remote controlled, or a smart self-controlled camera) 1602, a drone with a weapon 1606, a remote-control weapon 1608, external remote sensors sighting subsystem 1612 that is responsive to communications from the targeting subsystem 340 (from FIG. 3.), and multiple weapons systems 1614. The external subsystem 1600, remote to the human transported weapon, provides communications 1610 between the external subsystem 1600 and the human transported automated weapon system 100.

In one embodiment, as illustrated in FIG. 16., an automated weapons system is comprised of a human transported weapon for use by a person. The weapon is comprised of a barrel utilized for propelling a fired munitions to aim towards area of sighting. A targeting subsystem identifies a chosen target in the area of sighting. An external drone subsystem, with a sensing subsystem communicates to the targeting subsystem. The external drone subsystem is located remotely to the human transported weapon, and provides communications between the external drone subsystem and the human transported weapon. A computational subsystem, responsive to the targeting subsystem, determines where the chosen target is, and then determines where to aim the munitions so that the munitions will strike the chosen target. A positioning means adjusts the aim of the munitions responsive to the computational subsystem. Finally, a firing subsystem fires the munitions at the chosen target at the firing time, responsive to the positioning means.

As illustrated in FIG. 17., a plurality of weapon subsystems 1702, 1704, 1706 are linked through a communication link 1610 (from FIG. 16.) and a best target 1716, 1718, 1720 is selected from a plurality of possible targets 1716, 1718, 1720, for each automated weapon system 1702, 1704, 1706. The selection of a best target can rely on from one to a multitude of factors, such as an obstructed view 1708 (examples being a house 1712 or tree 1714) vs. an unobstructed view 1710 of the target, proximity to target, current motion vector of the target etc.

As illustrated in FIG. 17., an automated weapons system is comprised of a plurality of automated weapon subsystems comprising at least one human transported automated weapon system, where at least one of the plurality of the automated weapon systems <1702, 1704, 1706> (100 of FIG. 1.) takes a respective shot. Each automated weapon system is comprised of a barrel 310 (see FIG. 3. For 300's), a targeting subsystem 340, a computational subsystem 360, positioning means 355, and a firing subsystem 380. The barrel 310 is utilized for propelling a fired munitions 320 to aim towards an area of sighting 330. The targeting subsystem 340 identifies a chosen target 350 in the area of sighting 330. The computational subsystem 360 determines where the chosen target 350 is and where the barrel 310 needs to be aimed so that the munitions 320 will strike the chosen target 350, responsive to the targeting subsystem 340. The positioning means 355 adjusts the aim 315 of the munitions 320 responsive to the computational subsystem 360. The firing subsystem 380 fires the fired munitions 320 at the chosen target 350, responsive to the positioning means 355.

As illustrated in FIG. 17., a multi-weapon automated weapon system 300 (in reference to FIG. 3.) is comprised of a plurality of automated weapon system subsystems 1702, 1704, 1706, control logic 305, a targeting subsystem 340, computational logic 360, a positioning subsystem 355, and firing logic 380. Each of the plurality of automated weapon systems 300 provides for firing a munition 320 from it and has a respective field view 330. The automated weapon systems 300 are comprised of at least one human transported weapon subsystem 300 and at least one other weapon subsystem 1702, 1704, 1706. The control logic 305 links communications among multiple of the weapon subsystems 1702, 1704, and/or 1706 to coordinate said multiple of said weapon subsystems 1702, 1704, 1706. The targeting subsystem 340 provides a selected target 1716, 1718, 1720, responsive to computing a best shot selected from up to a plurality of possible shots in the field of view 330 selected for each of the linked said automated weapon system 300, responsive to the communications 1610 (from FIG. 16.), responsive to mapping by identifying which of the automated weapon systems 1702, 1704, 1706 is a selected said automated weapon system 300 that is in position to provide a best shot. The computational logic 360 determines where to aim the munition 320 from each said selected said weapons subsystem 1702, 1704, 1706, responsive to the targeting subsystem 340. The positioning subsystem 355 adjusts the aim of the automated weapon system 300 to compensate, as needed, for where the selected target 1716, 1718, 1720 is when firing the munitions 320 at a firing time, responsive to the computational logic 360. The firing logic 380 actuates firing of the munitions 320 from each said selected automated weapon system 300 (1702, 1704, 1706 plurality from FIG. 17.) at the firing time responsive to the targeting subsystem 340, the positioning subsystem 355 and the trigger activation logic 312.

FIG. 17. also illustrates a method for use of a human transported automated weapon system 100 with sensing 104 (100's in reference to FIG. 1.), tracking 1730, aim adjustment control (positioning means 155), and linked external weapons subsystem 1702, 1704, 1706 [for a best shot, of a human transported automated weapon system 100] for firing a munition 120. The method is further comprised of identifying at least one said target 1716, 1718, 1720 in a field of view 1725 as a selected target 1716, 1718, 1720. The selected target's 1716, 1718, 1720 location is then sensed and tracked (even through environment/obstructed view 1708) in the target area, which determines where the selected target 1716, 1718, 1720 is located at the firing time. Firing of the munition 120 is then initiated after aim of the munition is adjusted in order to hit the selected target 1716, 1718, 1720 fired at the firing time, responsive to determining the selected target's location.

FIG. 18. illustrates possible iterations (1800) that the computational subsystem 340 (from FIG. 3.) or the targeting subsystem 360 (from FIG. 3.) can utilize in order to select a level of damage 1801 (Non-lethal 1806, Lethal 1808) that is intended to be inflicted upon the selected target 1820. In scenarios where less than lethal options are desired, a non-lethal 1806 option can be selected, where a non-lethal round 1802 is selected and a non-lethal shot 1804/1818 is targeted. If a lethal option is desired, the Lethal 1808 option can be selected, where a lethal round 1812 is selected and a lethal shot 1814/1816 is targeted. There are also permutations such as using a lethal round 1812 on a non-lethal shot 1818, or a non-lethal round on a lethal shot 1816, with the intent being causing various levels 1806/1808 of damage 1801.

FIG. 18. also illustrates a method of automated control of a human transported automated weapon system 200 (from FIG. 2.) comprising a computational unit 250 able to fire a munitions 202 as aimed within a defined range and within a field of view 230. The method identifies up to a plurality of identified targets from within the defined range and within the defined field of view 230, selecting a selected target 1820/220 from the identified targets, adjusting the aim of the weapon so that the munitions 202 will hit the selected target 1820/220 at a firing time, and, firing the munitions 202 at the firing time. The munition 202 is aimed to cause a defined amount of damage 1801 to the selected target 1820. This defined amount of damage 1801 can be one of, but is not limited to, (a) a best shot, (b) a wounded leg shot, (c) a wounded arm shot, (d) a body shot, (e) a head shot, (f) a kill shot, (g) a wound shot, and (h) a warning shot.

FIG. 19. illustrates a linked drone 1902 and handheld Automated Weapons System 100. Target information from the drone sensors 1904 is provided to the automated weapon system 100 through a communication link 1910. A communications interface 1910 communicates with the external subsystem linked (drone) 1902. Drone sensors provide a sensing subsystem 1904 that communicates to a targeting subsystem 340 (from FIG. 3.). The targeting subsystem 340 identifies a selected target 1920 in the area of sighting 1906 of the drone 1902. In one embodiment, the munitions selection logic chooses a selected munitions 320 from up to a plurality of types of munitions 1101 (from FIG. 11.), for use with the said type of the chosen selected target 1920. The computational subsystem 360 in the Automated Weapons System 300, responsive to the targeting subsystem 340 in the drone 1902, determines where the selected target 1920 is and where the aim of the barrel 1916 needs to be so that the selected munitions 320 will strike the target 1920 if fired at a firing time.

As illustrated in FIG. 19., an automated weapons system 100 is comprised of a human transported automated weapon system subsystem 100, an external drone subsystem 1902, and a targeting subsystem 340 (from FIG. 3.). The human transported automated weapon system 100 has munitions 320 for firing. The external drone subsystem 1902 comprises a drone 1902 with a sensing subsystem 1904 that communicates to a targeting subsystem 340 and provides communications 1910 between the external drone subsystem 1902 and the human transported automated weapons system subsystem 100. A targeting subsystem 340 selects a chosen target 1920 from available targets (in field of view/area of sighting 1906). The human transported automated weapon system 100 subsystem is comprised (reference to FIG. 3.) of a computational subsystem 360, positioning means 355, and a firing subsystem 380. The computational subsystem 360 is responsive to the targeting subsystem 340 for determining where the chosen target 350 is located, and then determining where to aim so that the munitions 320 will strike the chosen target 350. The positioning means 355 adjusts the aim 315 when firing the munitions 320, responsive to the computational subsystem 360. The firing subsystem 380 fires the munitions 320 at the chosen target 350, responsive to the positioning means 355.

As illustrated in FIG. 20., the targeting subsystem 2001 can be mounted independent of the weapons system 100, such as mounted to the user's helmet 2002. With the help of sensors 2011, a communications link 2010 transfers data back and forth from the automated weapons system 100 to the targeting subsystem 2001. The user 2012 is then able to detect, identify and track targets 704 (from FIG. 7.) while reducing risk to said user 2012, such as maintaining cover when aiming around corners, over walls and around any other obstructions.

FIG. 21. Illustrates the targeting subsystem 2130 as separate from the Automated Weapons System 100. In this example, the targeting subsystem 2130 is mounted to a drone 2140 rather than to the weapons system 100. Targets may be detected, identified and tracked from the drone 2140 with the use of drone sensors 2150 and targeting info may be shared with a communications link 2170 and the weapon's sensors 104 (from FIG. 1.) with one or a plurality of automated weapon system subsystems independent from the drone 2140.

As illustrated in FIG. 21., an automated weapons system 100 (from FIG. 1.) is comprised of a human transported automated weapons system 300 (300 #'s from FIG. 3) for use by a person, a targeting subsystem 340, an external drone subsystem 1902, a computational subsystem 360, positioning means 155, and a firing subsystem 380. The human transported automated weapon system 100 for use by a person, is comprised of a barrel 102 utilized for propelling a fired munitions 120 aimed towards an area of sighting 330. The targeting subsystem 340 identifies a chosen target 350 in the area of sighting 330. The external drone subsystem 2140 is comprised of a sensing subsystem 2150 that communicates to the targeting subsystem 340, and is located remotely to the human transported automated weapons system 100, and provides communications 2170 between the external drone subsystem 2140 and the human transported automated weapons system 100. The computational subsystem 360 determines where the chosen target 350 is and then determines where to aim the munitions 320 so that the munitions 320 will strike the chosen target 350, responsive to the targeting subsystem 340. The positioning means 355 adjusts the aim of the munitions 320 responsive to the computational subsystem 360. Finally, the firing subsystem 380 fires the munitions 320 at the chosen target 350 responsive to the positioning means 355.

As illustrated in FIG. 22., a communications link 1610 is provided between a human transported Automated Weapons System 100 and a drone mounted weapons system 2201. The addition of a weapons system on the drone 2201 allows for a munitions 102 shot to be fired from the drone 2201, aiming at a selected target 120 in the drone's area of sighting 1906, in addition to that of the Automated Weapons System 100.

As illustrated in FIG. 22., an automated weapons system 100 is comprised of a human transported automated weapon system 100 for use by a person. The automated weapon system 100 (further shown in FIG. 3.) is comprised of a barrel 315, a targeting subsystem 340, a drone weapons subsystem 2201, a computational subsystem 360, positioning means 355, and a firing subsystem 380. The barrel 310 is utilized for propelling a fired munitions 320 aimed towards an area of sighting 330. The targeting subsystem 340 identifies a chosen target 350 in the area of sighting 330. The drone weapons subsystem 2201 has munitions with positioning and firing capability; and, has communications 1610 with the human transported weapons subsystem 100. The targeting subsystem 340 utilizes communications with the drone weapons subsystem 2201. The computational subsystem 360, responsive to the targeting subsystem 340, determines where the chosen target 120 is and where the barrel 102 needs to be aimed so that the munitions 320 will strike the chosen target 120. The positioning means 355 adjusts the aim of the munitions 320 responsive to the computational subsystem 360. The firing subsystem 380 fires the munitions 320 at the chosen target 120 responsive to the positioning means 355.

In one embodiment, as illustrated in FIG. 22., the drone 2201 is comprised of at least one of, but not limited to (from FIG. 16.), a camera 1602, (stationary, movable), (remote controlled); (smart self-controlled), a sensing subsystem 1612 that communicates to targeting subsystems, a barrel 102 within the stock 108 for propelling a munitions responsive to the targeting subsystems, an external sensor 104, data source communicating with the human transported automated weapon system, and a remotely controlled automated weapons subsystem 100 (stationary mount/movable mount), that is responsive through a communications link 1610 from the targeting subsystem 340 (from FIG. 3.).

From the foregoing, it will be observed that numerous variations and modifications may be effected without departing from the spirit and scope of the invention. It is to be understood that no limitation with respect to the specific apparatus illustrated herein is intended or should be inferred. It is intended to cover by the appended claims, all such modifications as fall within the scope of the claims.

The invention claimed is:

1. An automated weapons system comprising:
   a plurality of weapon subsystems each comprising at least one human transported weapon subsystem;
   each of said plurality of weapon subsystems comprising:
      a barrel utilized for propelling a fired munitions to aim towards an area of sighting;
      a targeting subsystem identifying a chosen target in the area of sighting;
      a computational subsystem, responsive to the targeting subsystem, determining where the chosen target is for each one of the plurality of weapon subsystems and where the barrel needs to be aimed for each one of the plurality of weapon subsystems, so that the munitions will strike the chosen target; and,
      positioning means, adjusting the aim of the munitions responsive to the computational subsystem;
   the system further comprising:
      a firing subsystem, firing the fired munitions from at least one to each of said plurality of weapon subsystems at the chosen target for said one of said plurality of weapon subsystems, responsive to the positioning means from at least one of the plurality of the weapons subsystems.

2. The system as in claim 1,
   wherein each of said plurality of weapon subsystems has:
      a respective field of view for firing a respective said munitions from the respective said weapon subsystem;
   communications logic, linking and coordinating communications among multiple of the weapon subsystems;
   wherein the targeting subsystem chooses the selected target responsive to computing a best shot for each of the weapon subsystems, from up to a plurality of possible shots in the field of view for each of the weapon subsystems, responsive to the communications and responsive to identifying which of the weapon subsystems is a selected weapon subsystem that is in position to provide a respective shot;
   wherein the computational subsystem, determines where to aim the munitions for each said selected said weapon subsystem, responsive to the targeting subsystem.

3. The system as in claim 2,
   wherein the munition is fired from a plurality of said selected said weapon subsystems.

4. The system as in claim 1,
   wherein all other of said plurality of weapon subsystems provides communications with the human transported weapon subsystem.

5. The system as in claim 1,
   wherein all other of said plurality of weapon subsystems each have a separate targeting subsystem that communicates with the separate targeting subsystem of the human transported weapon subsystem in determining selection of a chosen target for at least one of the human transported weapon subsystem and one of said additional weapon subsystems.

6. The system as in claim 1,
   wherein the targeting subsystem sequences through multiple possible targets to identify which said weapon subsystem is in a best position to provide a respective said best shot for each said possible target.

7. The system as in claim 1,
   wherein there are a plurality of types of said targets;
   wherein the identifying the identified targets determines if the identified target is within a defined ranged and within a field of view of aim of the human transported weapon;
   the system further comprising:
      means for identifying from within the identified targeti, one said type of target as an identified type of target,
      wherein the selecting the shot, selects as the chosen target, at least one said identified type of target from the identified targets.

8. A method of operating a plurality of automated weapon subsystems, comprising at least one human transported weapon subsystem comprised of a barrel, a targeting subsystem, a computational subsystem, positioning means, and a firing subsystem, the method comprising:
- determining which of the plurality of the weapon subsystems takes a respective shot,
- identifying a chosen target in the area of sighting;
- adjusting the aim of the munitions responsive to the targeting subsystem and the computational subsystem identifying and determining where the chosen target is and where the barrel needs to be aimed via the positioning means so that the munitions will strike the chosen target; and,
- firing the fired munitions through the barrel at the chosen target responsive to the positioning means and firing subsystem.

9. The method as in claim 8,
wherein each said additional weapon subsystem has a respective field of view for firing a respective said munitions from the respective said weapon subsystem;
the method further comprising:
- linking and coordinating communications among multiple of the weapon subsystems and the human transported weapon subsystem;
- choosing the selected target responsive to computing a best shot for each of the linked said additional weapon subsystems, from up to a plurality of possible shots in the field of view for each of the additional weapon subsystems, responsive to the communications and responsive to identifying which of the weapon subsystems is a selected weapon subsystem that is in position to provide a respective shot;
- determining where to aim the munitions for each of said selected said weapons subsystems, responsive to the choosing the selected target.

10. The method as in claim 9,
wherein the munitions is fired from a plurality of said selected said weapon subsystems.

11. The method as in claim 8, further comprising:
providing communications between the human transported weapon subsystem and each other of the plurality of weapon subsystems.

12. The method as in claim 8,
wherein there are a plurality of said targeting subsystems, each belonging to a separate one of said plurality of weapon subsystems and the human transported weapon subsystem;
the method further comprising:
communicating between the said targeting subsystems, to determine selection of a chosen target for at least one of the human transported weapon and for said additional weapon subsystems.

13. The method as in claim 8, further comprising:
identifying which said weapon subsystem is in a best position to provide a respective said best shot for each said possible target by sequencing through multiple possible targets.

14. The method as in claim 8,
wherein there are a plurality of types of said targets;
the method further comprising:
identifying the selected target is within a defined range and within a field of view of aim of the human transported weapon;
the method further comprising:
identifying one said type of target as an identified type of target from within the identified targets,
selecting as the selected target, at least one said identified type of target from the identified targets.

15. A system for operating a plurality of automated weapon subsystems comprising at least one human transported weapon subsystem comprised of a barrel and a firing subsystem, the system comprising:
- means for determining which at least one of the plurality of the weapon subsystems is a selected weapon that takes a respective shot for said said-one of the plurality of the weapon subsystems,
- means for identifying a chosen target in the area of sighting for each said selected weapon;
- means for adjusting the aim of the munitions, for each said selected weapon, responsive to the identifying and determining where the chosen target is and where the barrel needs to be aimed so that the munitions will strike the chosen target; and,
- means for firing the fired munitions at the chosen target, for each said selected weapon, responsive to the positioning means.

16. The system as in claim 15, wherein each said additional weapon subsystem has a respective field of view for firing a respective said munitions from the respective said weapon subsystem;
the system further comprising:
- means for linking and coordinating communications among multiple of the additional weapon subsystems and the human transported weapon subsystem;
- means for choosing the selected target responsive to computing a best shot for each of the said additional weapon subsystems, from up to a plurality of possible shots in the field of view for each of the additional weapon subsystems, responsive to the communications and responsive to identifying which of the additional weapon subsystems and the human transported weapon, is a selected weapon subsystem that is in position to provide a respective said best shot; and,
- means for determining, where to aim the munitions for each of said selected said weapons subsystem, responsive to the choosing a respective said selected target.

17. The system as in claim 16,
wherein the munition is fired from each of a plurality of said selected said weapon subsystems.

18. The system as in claim 15, further comprising:
means for providing communications between the human transported weapon subsystem and each other of the plurality of weapon subsystems.

19. The system as in claim 15, further comprising:
means for identifying which said weapon subsystem is in a best position to provide a respective said best shot for each said possible target by sequencing through multiple said possible targets;
means for determining, where to aim the munitions for each of said selected said weapons subsystem, responsive to the means for identifying and the means for choosing the selected target for each respective said selected target.

20. The system as in claim 15,
wherein there are a plurality of types of said targets;
the system further comprising:
means for identifying one said type of target as an identified type of target; means for selecting as the chosen target, at least one said identified type of target from the identified targets; and,
means for identifying the chosen target is within a defined ranged and within a field of view of aim of the human transported weapon.

21. The system as in claim 15,
wherein all other of said plurality of weapon subsystems each have a separate said targeting subsystem that communicates with a separate said targeting subsystem of the human transported weapon subsystem, for determining selection of a chosen target for at least one of the human transported weapon subsystem and one of said additional weapon subsystems.

\* \* \* \* \*